United States Patent
Österlund et al.

(10) Patent No.: US 11,513,954 B2
(45) Date of Patent: Nov. 29, 2022

(54) CONSOLIDATED AND CONCURRENT REMAPPING AND IDENTIFICATION FOR COLORLESS ROOTS

(71) Applicant: Oracle International Corporation, Redwood Shores, CA (US)

(72) Inventors: Erik Österlund, Västerhaninge (SE); Per Liden, Stockholm (SE); Stefan Mats Rikard Karlsson, Nacka (SE)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/212,185

(22) Filed: Mar. 25, 2021

(65) Prior Publication Data

US 2022/0308870 A1   Sep. 29, 2022

(51) Int. Cl.
*G06F 12/02* (2006.01)

(52) U.S. Cl.
CPC ................ *G06F 12/0253* (2013.01)

(58) Field of Classification Search
CPC ............ G06F 12/0253; G06F 12/0276; G06F 12/0269; G06F 12/023
USPC .......... 711/170, E12.009; 707/813, 816, 819
See application file for complete search history.

(56) References Cited

U.S. PATENT DOCUMENTS

| | | | |
|---|---|---|---|
| 5,765,007 A | 6/1998 | Rahman et al. | |
| 5,873,104 A | 2/1999 | Tremblay et al. | |
| 5,928,357 A | 7/1999 | Underwood et al. | |
| 6,304,949 B1 | 10/2001 | Houlsdworth | |
| 6,769,004 B2 | 7/2004 | Barrett | |
| 7,089,272 B1 | 8/2006 | Garthwaite et al. | |
| 7,404,182 B1 * | 7/2008 | Garthwaite | G06F 12/0269 717/140 |
| 7,546,587 B2 | 6/2009 | Marr et al. | |
| 9,208,081 B1 | 12/2015 | Dice et al. | |

(Continued)

FOREIGN PATENT DOCUMENTS

| | | |
|---|---|---|
| JP | 4265610 B2 | 5/2009 |
| WO | 00/29937 A2 | 5/2000 |

OTHER PUBLICATIONS

"ZGC—Generations Revision 2," accessed at https://wiki.se.oracle.com/display/JPG/ZGC+-+Generations+Revision, Feb. 1, 2020, pp. 6.

(Continued)

*Primary Examiner* — Hashem Farrokh
(74) *Attorney, Agent, or Firm* — Invoke

(57) ABSTRACT

During a concurrent Relocation Phase, a GC thread relocates live objects, as an application thread executes. References in a frame on a call stack are remapped if the application thread attempts to access the frame. References on the call stack remains stale if no application thread attempts access. The GC thread may proceed with a subsequent phase of a GC cycle, even if a frame has stale references and therefore has not assumed a remap state. During a concurrent Mark/Remap Phase, the call stack may include frames in different frame states. The GC thread selects appropriate operations for processing each frame based on the respective frame state. When the GC thread encounters a frame not in the remap state, references therein are first remapped, and then identified as roots. Hence, root reference remapping and identification are performed in a single concurrent phase of a GC cycle.

20 Claims, 21 Drawing Sheets

(56) References Cited

U.S. PATENT DOCUMENTS

| | | | |
|---|---|---|---|
| 10,261,898 | B1 | 4/2019 | Payer |
| 10,996,884 | B2 | 5/2021 | Danilov et al. |
| 2004/0186863 | A1 | 9/2004 | Garthwaite |
| 2004/0187102 | A1 | 9/2004 | Garthwaite |
| 2005/0235006 | A1 | 10/2005 | Adl-Tabatabai et al. |
| 2007/0022149 | A1 | 1/2007 | Bacon et al. |
| 2010/0114998 | A1 | 5/2010 | Steensgaard et al. |
| 2012/0203804 | A1 | 8/2012 | Burka et al. |
| 2014/0310235 | A1* | 10/2014 | Chan ................ G06F 16/285 707/603 |
| 2015/0006843 | A1 | 1/2015 | Moser |
| 2015/0081996 | A1 | 3/2015 | Flood |
| 2017/0344473 | A1 | 11/2017 | Gidra et al. |
| 2019/0042406 | A1 | 2/2019 | Guniguntala et al. |
| 2020/0081748 | A1 | 3/2020 | Johnson et al. |
| 2020/0125364 | A1 | 4/2020 | Osterlund |
| 2020/0310963 | A1 | 10/2020 | Nilsen |
| 2021/0278990 | A1 | 9/2021 | Choi |
| 2022/0138098 | A1* | 5/2022 | Österlund ........... G06F 12/0269 707/813 |

OTHER PUBLICATIONS

Wilson, P.R., et al., "A "Card-making" scheme for controlling intergenerational differences in generation—based garbage collection on stock hardware," ACM SIGPLAN Notices, vol. 24, Issue 5, May 1989, pp. 87-92.

Yuasa, T., "Real-time garbage collection on general-purpose machines," Journal of Systems and Software, vol. 11, Issue 3, <arch 1990, pp. 181-198.

Click et al.; "The Pauseless GC Algorithm", VEE 05, Jun. 11-12, 2005, Chicago, Illinois, USA. Copyright 2005 ACM 1-59593-047-7/05/0006.. .S5.00.

David Gnedt, "Fast Profiling in the HotSpot Java VM with Incremental Stack Tracing and Partial Safepoints," Faculty of Engineering and Natural Sciences, 2014, 57 pages.

Domani et al., "Implementing an on-the-fly Garbage Collector for Java," ACM SIGPLAN Notices, vol. 36, No. 1, 2000, pp. 155-166.

Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.

Main—Main—OpenJDK Wiki, Created by Iris Clark, last modified by Per Liden, available online at <URL: https://wiki.openjdk.java.net/display/zgc/Main>, Oct. 15, 2020, 9 pages.

Open JDK, "HotSpot Glossary of Terms", 2006, Sun Microsystems, available at <https://openjdk.java.net/groups/hotspot/docs/HotSpotGlossary.html>, 6 pages.

Osterlund et al., "Block-Free Concurrent GC: Stack Scanning and Copying," International Symposium on Memory Management, vol. 51, 2016, 12 pages.

Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.

Robbin Ehn, "JEP 312: Thread-Local Handshakes," Hotspot Dash Dev at Openjdk Dot Java Dot Net, available at <http://openjdk.java.net/jeps/312>, 2018, 3 pages.

Tene et al.; C4: The Continuously Concurrent Compacting Collector ISMM'11, Jun. 4-5, 2011, San Jose, CA, USA Copyright 2011, ACM 978-M503-0263-0/11/06...$10.00.

The Z Garbage Collector—Low Latency GC OpenJDK, available online at <http://cr.openjdk.java.net/~pliden/slides/ZGC-Jfokus-2018pdf>, 2018, 96 pages.

Yang et al., "Improving Program Locality in the GC using Hotness," PLDI' 20, pp. 301-313, Jun. 15-20, 2020.

Yuasa et al., "Return Barrier," International Lisp Conference, 2002, 12 pages.

ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.

A concurrent, generational garbage collector for a multithreaded implementation of ML by Doligez (Year: 1993).

A Hardware Accelerator for Tracing Garbage Collection by Maas (Year: 2018).

Generational Garbage Collection, Write Barriers/Write Protection and userfaultfd(2) by Cracauer (Year: 2016).

Getting started with Z Garbage Collector(ZGC) in Java 11 [Tutorial] by Davis (Year: 2019).

JEP 333: ZGC: A Scalable Low-Latency Garbage Collector(Experimental) by Liden and Karlsson (Year: 2020).

Mostly Concurrent Garbage Collection Revisited by Barabash (Year: 2003).

Write Barrier Elision for Concurrent Garbage Collectors by Vechev (Year: 2004).

Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.

Yang et al., "Deep Dive into ZGC: A Modern Garbage Collector in OpenJDK", ACM Transactions on Programming Language and Systems, ACM, New York, NY, 2022, vol. 44, No. 4, 34 Pages.

\* cited by examiner

Dereferenceable Reference
601

Heap Reference
600

Adding a color watermark:

Mark/Remap:

Function Execution:

Function Epilogue:

Frame Barrier:

Bringing a Reference/Frame State to a Global State:

Table 1500

| Frame State or Reference State \ Global State | Current Mark State | Remap State |
|---|---|---|
| Current Mark State | [None] | 1. Remap address<br><br>1506 |
| Remap State | 1. Identify reference as a root<br><br>1502 | [None] |
| Old Mark State | 1. Remap address<br>2. Identify reference as a root<br><br>1504 | [N/A] |

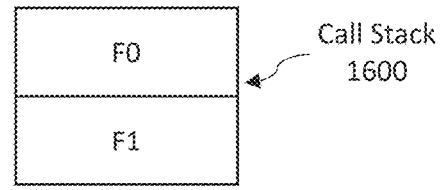
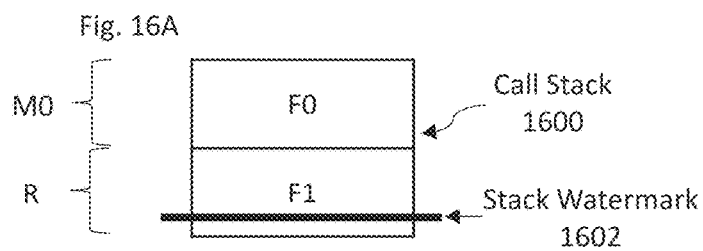
Fig. 16A
Fig. 16B

CONSOLIDATED AND CONCURRENT REMAPPING AND IDENTIFICATION FOR COLORLESS ROOTS

RELATED APPLICATIONS; INCORPORATION BY REFERENCE

This application is related to U.S. patent application Ser. No. 15/267,748, filed Sep. 16, 2016; U.S. patent application Ser. No. 16/446,370, filed Jun. 19, 2019; U.S. patent application Ser. No. 17/084,053, filed Oct. 29, 2020; application Ser. No. 17/212,190, Titled "Implementing State-Based Frame Barriers To Process Colorless Roots During Concurrent Execution", filed Mar. 25, 2021; application Ser. No. 17/212,276, Titled "Tracking Frame States of Call Stack Frames Including Colorless Roots", filed Mar. 25, 2021, each of which is hereby incorporated by reference.

TECHNICAL FIELD

The present disclosure relates to garbage collection. In particular, the present disclosure relates to processing colorless roots during garbage collection.

BACKGROUND

A compiler converts source code, which is written according to a specification directed to the convenience of the programmer, to machine code (also referred to as "native code" or "object code"). Machine code is executable directly by a physical machine environment. Additionally or alternatively, a compiler converts source code to an intermediate representation (also referred to as "virtual machine code/instructions"), such as bytecode, which is executable by a virtual machine that is capable of running on top of a variety of physical machine environments. The virtual machine instructions are executable by the virtual machine in a more direct and efficient manner than the source code. Converting source code to virtual machine instructions includes mapping source code functionality, according to the specification, to virtual machine functionality, which utilizes underlying resources (such as data structures) of the virtual machine. Often, functionality that is presented in simple terms via source code by the programmer is converted into more complex steps that map more directly to the instruction set supported by the underlying hardware on which the virtual machine resides.

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. Garbage collection systems free the programmer from having to explicitly specify which objects to deallocate. However, applications often need to pause while waiting for garbage collection operations to complete. One way to reduce these pause times is to use a garbage collector that supports concurrent garbage collection operations in at least some phases of a garbage collection cycle. Applications need only pause during non-concurrent garbage collection operations but may run concurrently (including continuing to allocate new objects if necessary) during concurrent garbage collection operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 16A-16H illustrate an example using a stack watermark and color watermarks to perform concurrent root reference processing according to an embodiment.

DETAILED DESCRIPTION

Figure 1:
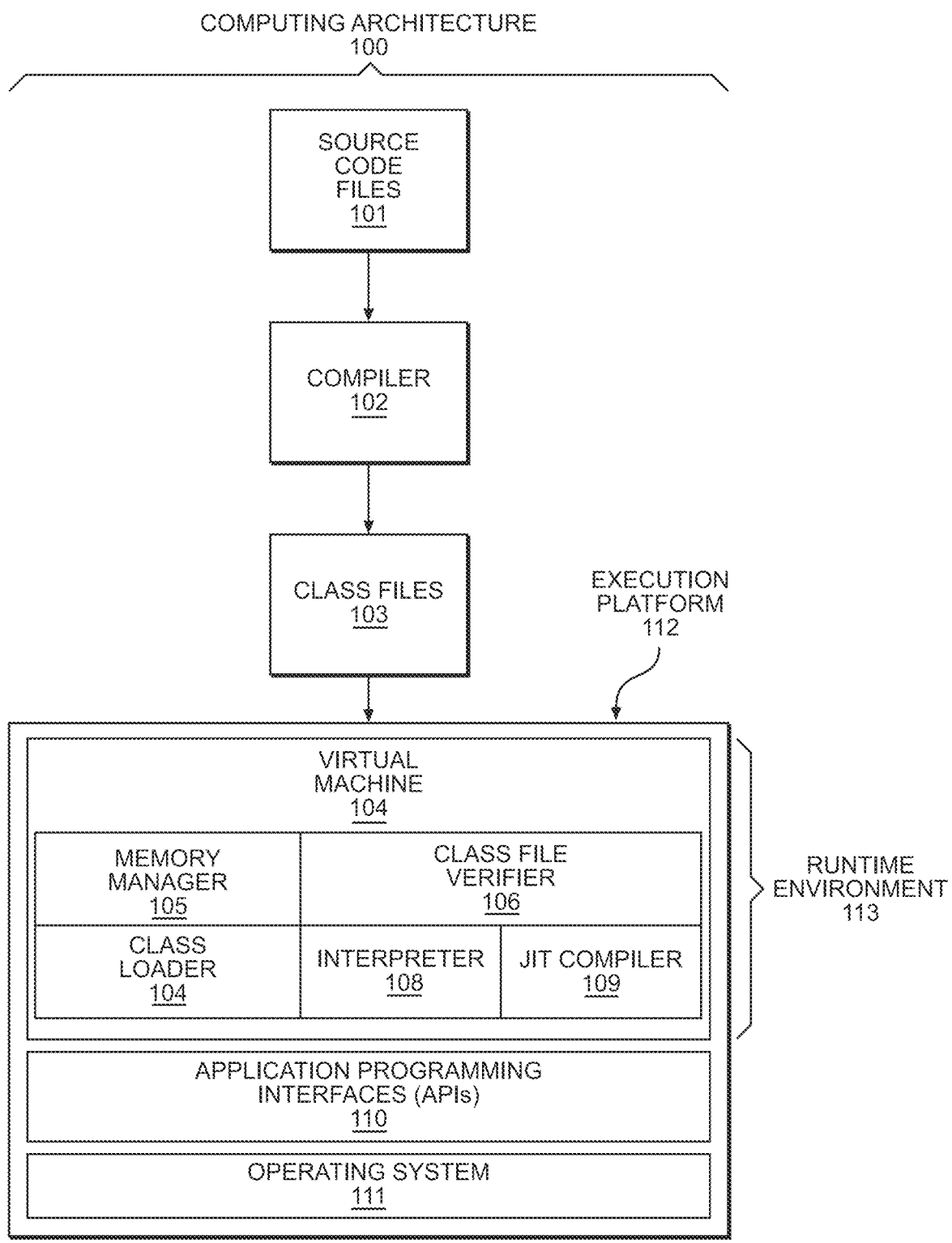
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. ADDING A COLOR WATERMARK TO TRACK FRAME STATES OF FRAMES ON A CALL STACK
5. MARKING AND REMAPPING ROOT REFERENCES IN A FRAME ON A CALL STACK BY A GARBAGE COLLECTION THREAD
6. PROCESSING A FRAME BARRIER TO A FRAME ON A CALL STACK BY AN APPLICATION THREAD
7. CANDIDATE SLOW PATHS FOR UPDATING TO A GLOBAL STATE
8. EXAMPLE EMBODIMENT
9. MISCELLANEOUS; EXTENSIONS
10. HARDWARE OVERVIEW

1. GENERAL OVERVIEW

Garbage collection (GC) is a process for reclaiming unused heap memory. In an embodiment, a GC thread performs object tracing, starting from a set of root references, to thereby identify live objects on a heap memory. Root references on a call stack associated with an application thread are also referred to as "thread stack roots." Once live objects are identified and marked, the marked objects are relocated from evacuation regions of the heap to destination regions of the heap. References (including root references) corresponding to the relocated objects are remapped to reflect the relocation. An application thread allocates memory for newly-created objects from an evacuation region of the heap, thereby potentially overwriting unused objects (also referred to as "dead objects") that remain in the evacuation region.

One or more embodiments include a GC cycle having a single concurrent phase for both root reference identification and root identification remapping. The phases of a GC cycle include:

Phase 1 (safepoint): Establish Current Mark Global State (M0 or M1);
Phase 2 (concurrent): Mark and Remap;
Phase 3 (safepoint): Mark End;
Phase 4 (concurrent): Evacuation Selection;
Phase 5 (safepoint): Establish Remap Global State (R);
Phase 6 (concurrent): Relocate.

"Safepoint" refers to stopping application threads. During a safepoint phase, no application threads are allowed to execute. "Concurrent" refers to concurrent execution of GC threads and application threads. During a concurrent phase, an application thread is allowed to execute concurrently with an execution of a GC thread. "Global state" refers to a state assumed by a reference when all GC operations for a current phase of a GC cycle are completed with respect to the reference. When a GC thread or application thread encounters a reference, the GC thread or application thread performs certain operations with respect to the reference to bring a state of the reference to the current global state.

Based on the phases described above, the Establish Remap Global State Phase ends, and the Relocate Phase begins, even if relocation and remapping have not yet been completed with respect to thread stack roots on the call stack. A safepoint is not required for performing relocation and remapping for thread stack roots. Rather, relocation for thread stack roots is performed during the concurrent Relocate Phase by the GC thread. Remapping for thread stack roots is performed either during the concurrent Relocate Phase (of the current GC cycle) by the application thread or during the concurrent Mark and Remap Phase (of the next GC cycle) by the GC thread. Hence, the cumulative duration of safepoints during a GC cycle may be reduced.

Further based on the phases described above, the Mark and Remap Phase includes both marking and remapping of references (including root references). At the start of the Mark and Remap Phase, a call stack may concurrently include thread stack roots that have been remapped (consistent with object locations resulting from the previous GC cycle), and thread stack roots that have not yet been remapped (inconsistent with object locations resulting from the previous GC cycle). Different operations are used for (a) bringing a reference from the remap state to the current mark state and (b) bringing a reference from the old mark state to the current mark state. For example, bringing a reference from the old mark state to the current mark state may include remapping the reference, and identifying the reference as a thread stack root; while bringing a reference from the remap state to the current mark state may include identifying the reference as a thread stack root, without remapping the reference. A GC thread traverses frames on the call stack to process the thread stack roots. The GC thread identifies a respective frame state for each frame. A "frame state" is a reference state implicated for each thread stack root in the same frame. A "reference state" tracks a progress of GC operations performed with respect to a reference. The GC thread selects appropriate operations for bringing each frame from the respective frame state to the current global state (that is, the current mark state). Hence, the GC thread may perform different operations with respect to different thread stack roots on a same call stack in a single GC phase. Therefore, the GC thread ensures that both remapping (as necessitated by the previous GC cycle) and marking (for the current GC cycle) have been performed with respect to each thread stack root at the end of the Mark and Remap Phase.

One or more embodiments include prohibiting an application thread (concurrently executing with a GC thread) from returning to a target frame that has not yet assumed a current global state. As described above, a call stack may concurrently have frames of different frame states (and thereby references of different reference states). Different operations are used for bringing different frame states to the current global state. A stack watermark is shifted to indicate a deepest frame on a call stack having the current global state. Each of a set of color watermarks is associated with a particular state, and each color watermark is shifted to indicate a deepest frame on the call stack having the associated state. If a target frame already has the current global state, then the application thread returns to the target frame without needing to first perform GC operations on the target frame. Otherwise, the application thread selects appropriate operations for bringing the target frame from the frame state to the current global state.

One or more embodiments including using color watermarks to track frame states of frames on a call stack associated with an application thread. Each thread is associated with a stack watermark, one or more color watermarks, and a stack state. As described above, a stack watermark is shifted to indicate a deepest frame on a call stack having the current global state. Each color watermark is shifted to indicate a deepest frame on the call stack having the associated state. Each color watermark indicates both (a) the frame being marked, and (b) the frame state of the marked frame (such as, M0, M1, or R). A stack state is equal to the global state when the stack watermark is valid. The stack watermark, color watermarks, and stack state may be stored in thread-specific variables. In particular, the thread-specific variables storing the color watermarks may be implemented as a thread-specific circular buffer.

A color watermark is added after a global state change during thread initialization. A safepoint is established for changing from an old global state to a new global state. After exiting the safepoint, each application thread undergoes thread initialization to re-validate the associated stack watermark. Before thread initialization begins, a stack watermark marks a deepest frame on a call stack having the old global state. A stack state is equal to the old global state, thereby indicating that the stack watermark is invalid. During thread initialization, a color watermark is added to indicate that the deepest frame having the old global state is the frame currently marked by the stack watermark. Hence, the added watermark is associated with (a) the frame currently marked by the stack watermark and (b) the old global state. Further, one or more shallowest frames are processed to assume the new global state. The stack watermark is updated to indicate the deepest frame having the new global state (based on the frames processed during the current thread initialization). The stack state is updated to the new global state, which thereby validates the stack watermark. Once a stack watermark is validated, the application thread (concurrently executing with the GC thread) may access the stack watermark to determine a frame state of a target frame.

A color watermark is deleted after the frame marked by the color watermark is brought to the current global state. Either an application thread or a GC thread may identify a particular frame for processing. (The application thread identifies the particular frame as part of an attempts to return to the particular frame, or the GC thread identifies the particular frame as part of a traversal of the call stack during a Mark and Remap Phase.) A frame state of the particular frame is determined based on a particular color watermark. The particular frame is processed to achieve the current global state. The stack watermark is then shifted to mark the last-processed frame. If the updated stack watermark and the particular color watermark mark the same frame, then the particular color watermark is deleted. The particular color watermark is obsolete, since the next to-be-processed frame has a frame state that is determinable based on a next color watermark.

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
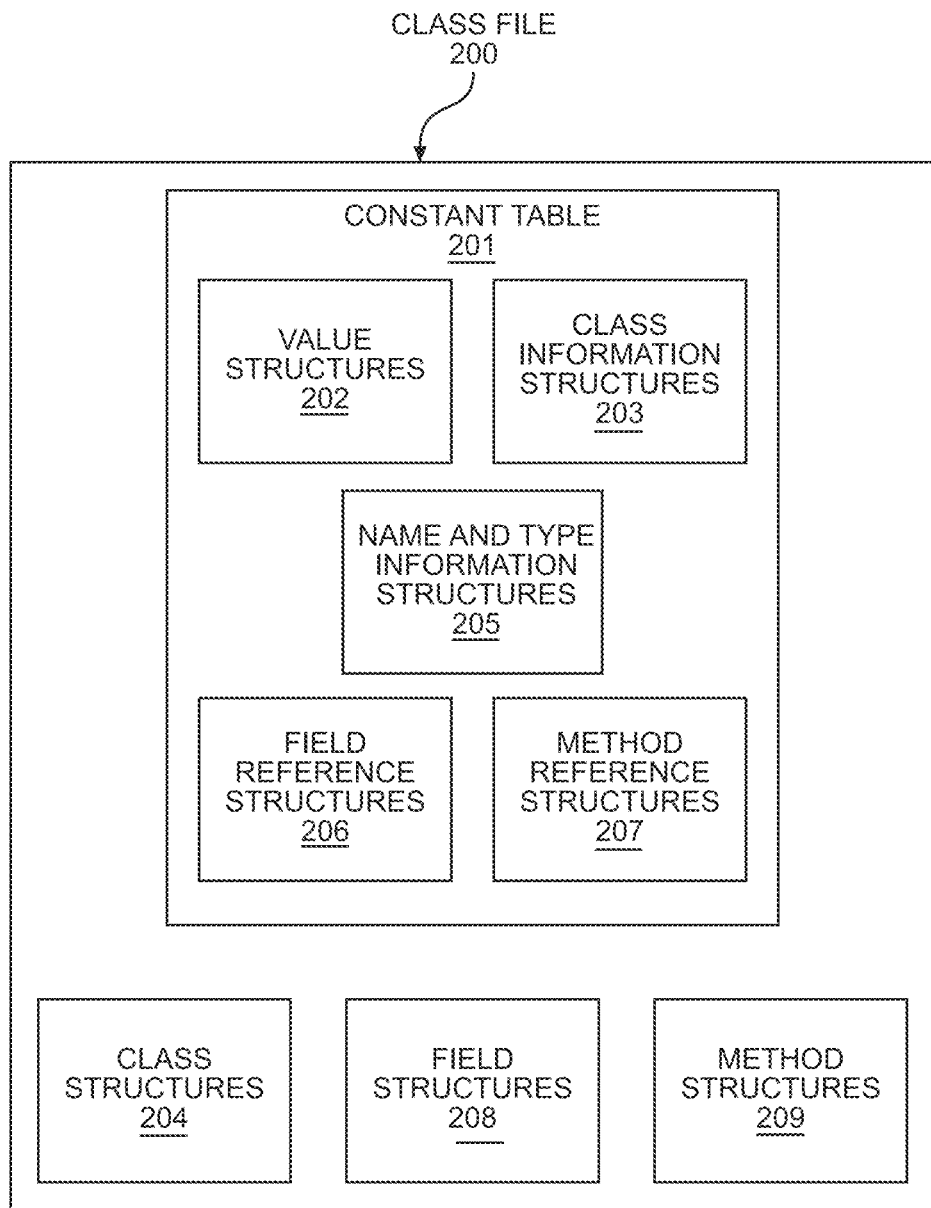
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
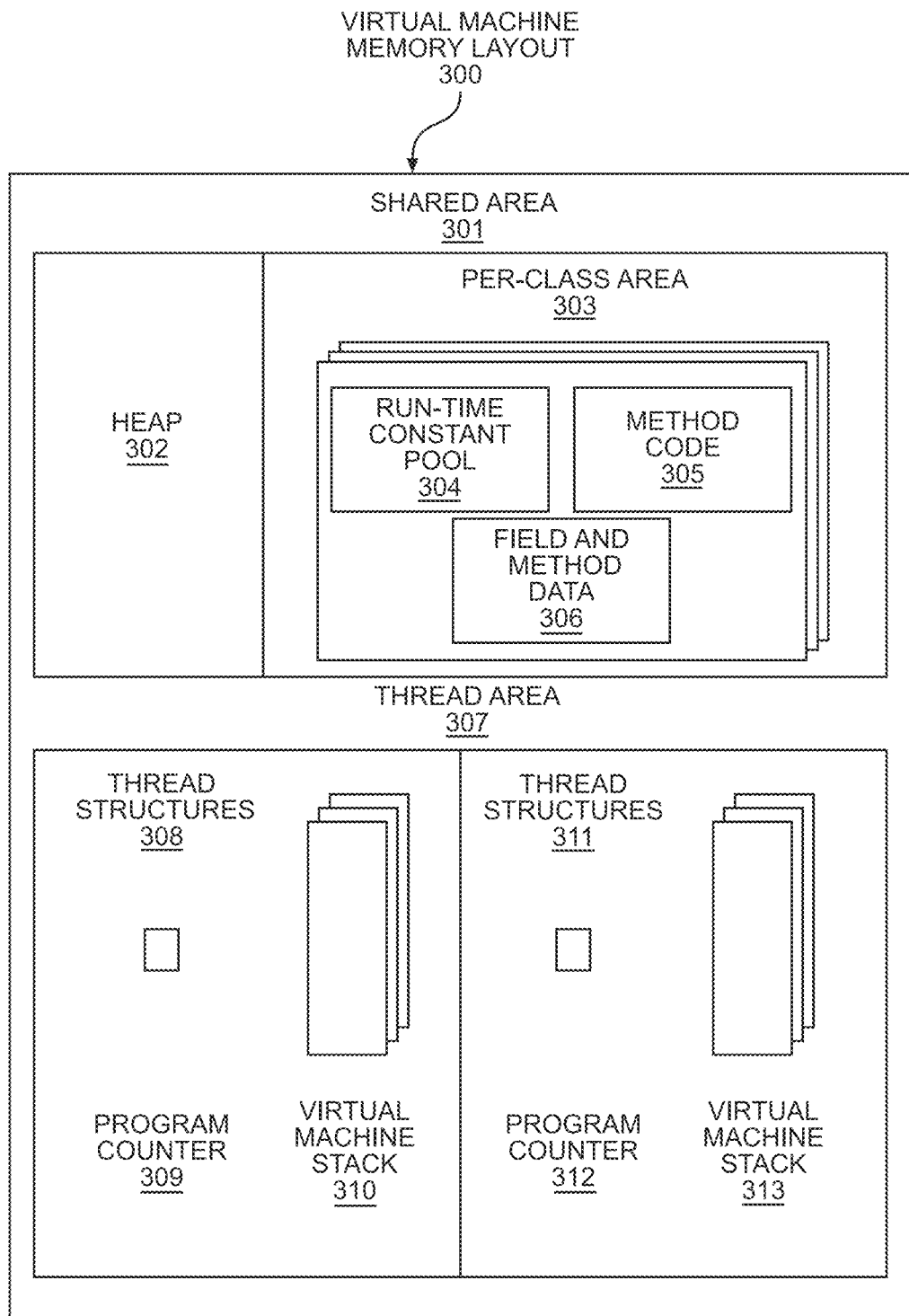
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
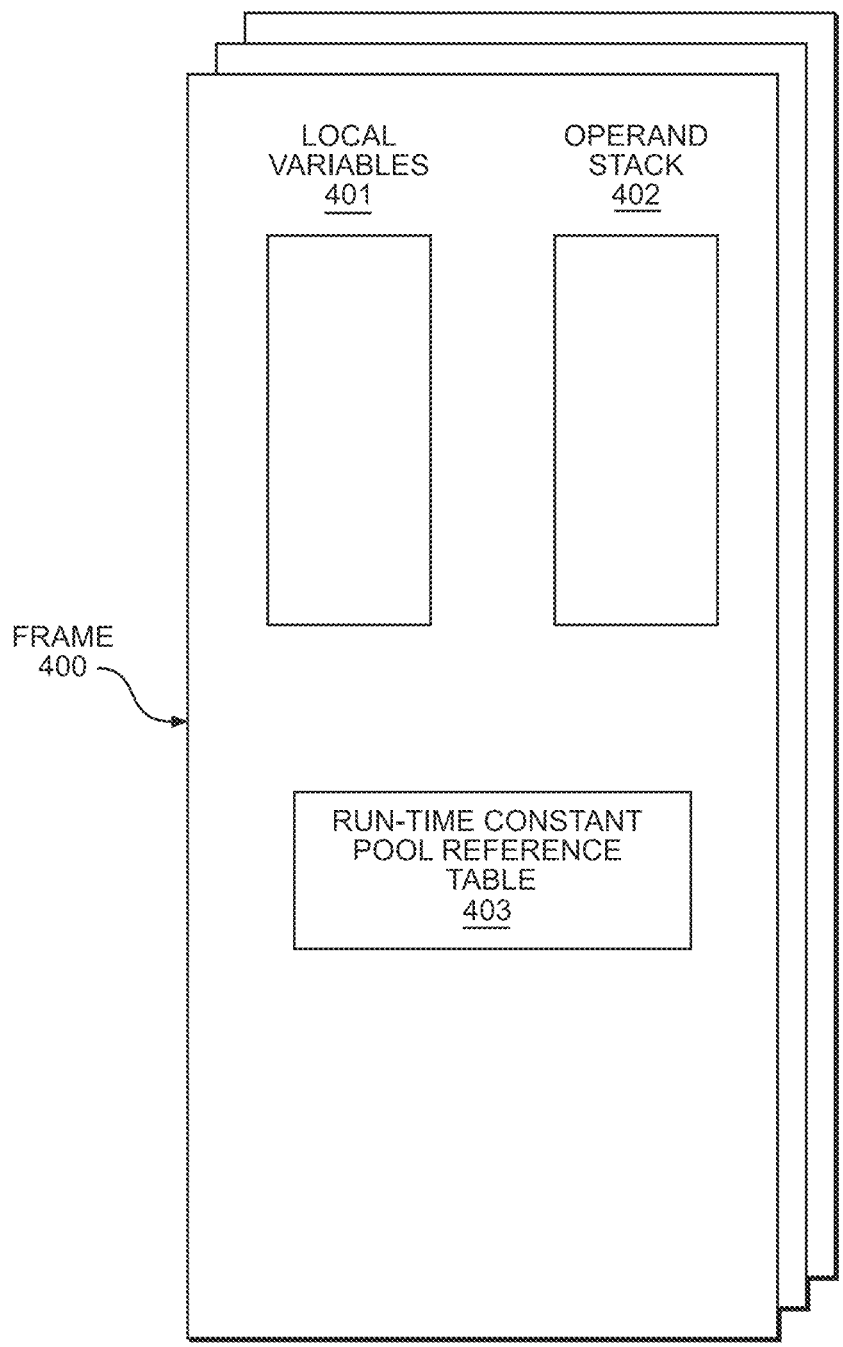
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. GARBAGE COLLECTION

Figure 5:
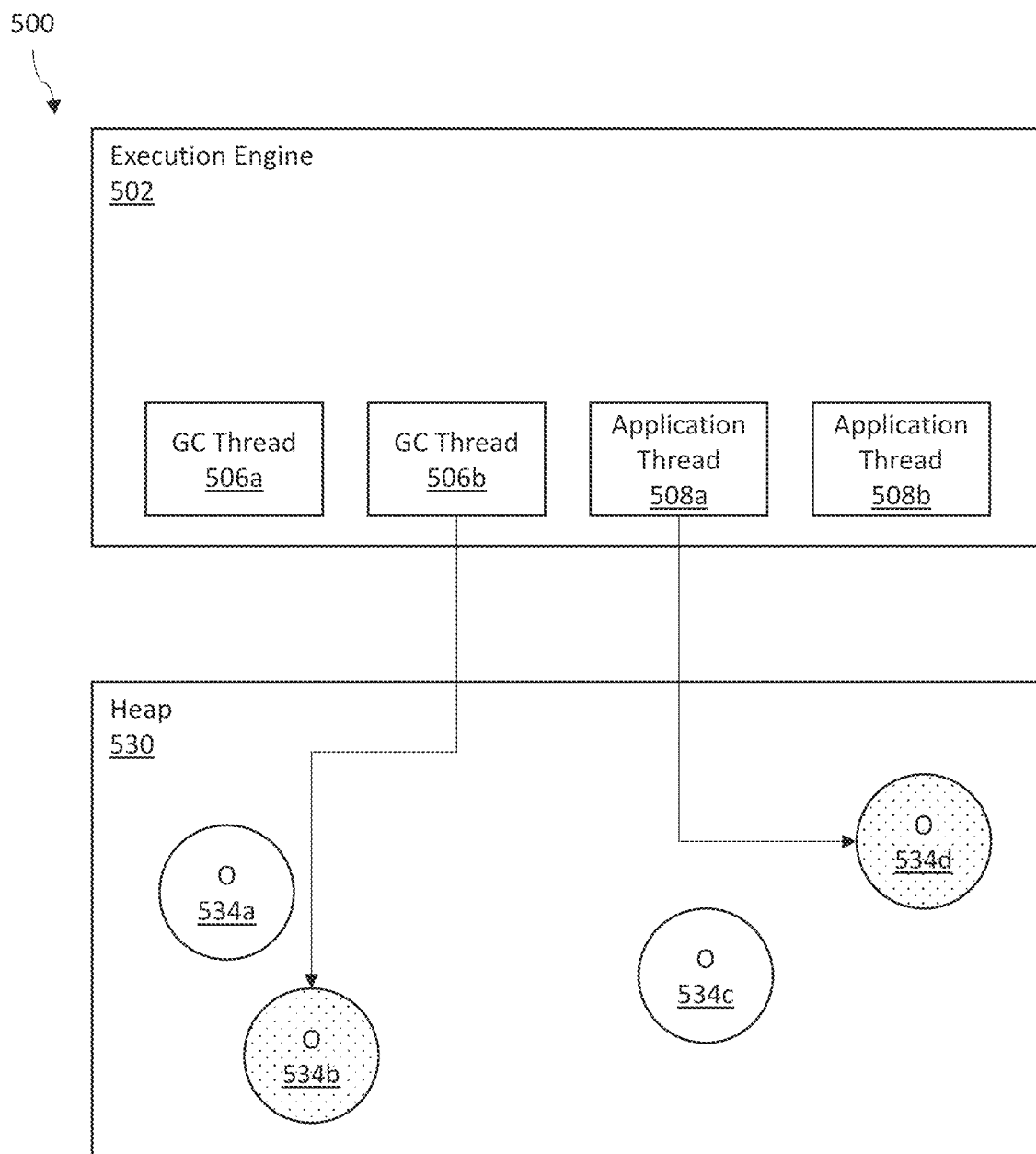
FIG. 5 illustrates an execution engine and a heap memory of a virtual machine according to an embodiment.

FIG. 5 illustrates an execution engine and a heap memory of a virtual machine according to an embodiment. As illustrated in FIG. 5, a system 500 includes an execution engine 502 and a heap 530. The system 500 may include more or fewer components than the components illustrated in FIG. 5. The components illustrated in FIG. 5 may be local to or remote from each other.

In one or more embodiments, a heap 530 represents the run-time data area from which memory for class instances and arrays is allocated. An example of a heap 530 is described above as heap 302 in FIG. 3.

A heap 530 stores objects 534*a-d* that are created during execution of an application. An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects.

A heap 530 stores live objects 534*b*, 534*d* (indicated by the dotted pattern) and unused objects 534*a*, 534*c* (also referred to as "dead objects," indicated by the blank pattern). An unused object is an object that is no longer being used by any application. A live object is an object that is still being used by at least one application. An object is still being used by an application if the object is (a) pointed to by a root reference, or (b) traceable from another object that is pointed to by a root reference. "Root references" are a defined set of references serving as starting points for live object tracing. Different types of root references exist, such as thread stack roots, thread head roots, and references in compiled methods. A first object is "traceable" from a second object if a reference to the first object is included in the second object.

Sample code may include the following:
class Person {
  public String name;
  public int age;
  public static void main(String[ ] args){
  Person temp=new Person( );
  temp.name="Daphne";
  temp.age=6;
  }
}

An application thread 508a executing the above sample code creates an object temp in a heap 530. The object temp is of the type Person and includes two fields. Since the field age is an integer, the portion of the heap 530 that is allocated for temp directly stores the value "6" for the field age. Since the field name is a string, the portion of the heap 530 that is allocated for temp does not directly store the value for the name field; rather the portion of the heap 530 that is allocated for temp stores a reference to another object of the type String. The String object stores the value "Daphne." The String object is referred to as being "traceable" from the Person object.

In one or more embodiments, an execution engine 502 includes one or more threads configured to execute various operations. As illustrated, for example, an execution engine 502 includes garbage collection (GC) threads 506a-b and application threads 508a-b.

In one or more embodiments, an application thread 508a-b is configured to perform operations of one or more applications. An application thread 508a-b creates objects during run-time, which are stored onto a heap 530. An application thread 508a-b may also be referred to as a "mutator," because an application thread 508a-b may mutate the heap 530 (during concurrent phases of GC cycles and/or between GC cycles).

In one or more embodiments, a GC thread 506a-b is configured to perform garbage collection. "Garbage collection" refers to reclaiming memory locations in a heap 530 that are occupied by unused objects 534a, 534c. Multiple GC threads 504a-b may perform garbage collection in parallel. One or more GC threads 504a-b may perform garbage collection concurrently with executions of one or more application threads 508a-b.

Garbage collection generally involves marking live objects, and reclaiming memory occupied by unused objects. In particular, marking involves identifying a set of live objects traceable from a set of root references existing at a given time. When an object is identified as live, a live bit within the object header of the object may be marked. Reclaiming involves making memory occupied by unused objects available for allocation to new objects created by an application thread, thereby allowing the unused objects to be overwritten.

Garbage collection generally involves iteratively performing GC cycles, triggered by a schedule and/or an event (such as exceedance of a threshold allocation of a heap (or region thereof)). A GC cycle includes a series of phases, which work together to perform marking and reclamation. Each phase may be either a safepoint phase or a concurrent phase. A safepoint requires executions of application threads in the same execution engine be stopped. A concurrent phase allows executions of application threads to be concurrent with executions of GC threads.

Different types of GC cycles include different GC phases that organize and/or implement the steps of marking and reclaiming in different ways. Different implementations of garbage collection achieve different memory efficiencies, time efficiencies, and/or resource efficiencies.

One implementation of marking involves using marking stacks. Objects that are identified as live are pushed as an entry onto a marking stack. A GC thread traverses the marking stack to (a) mark each object as live (for example, in the object header or in the bit map), and (b) follow the transitive closure of each object. The GC thread follows the transitive closure of a target object by identifying additional objects referenced by the target object, and pushing each identified additional object as an entry onto the marking stack. When the GC thread has drained the marking stack, the GC thread has completed traversal of the transitive closure of the object graph and identified all live objects with respect to the current GC cycle.

One implementation of memory reclamation involves "sweeping" a heap. During a sweep phase of a GC cycle, a GC thread traverses the heap to identify all chunks of consecutive memory address spaces having non-marked objects (which are unused objects). The GC thread links together the non-marked chunks into organized free lists. The non-marked chunks are reclaimed. The non-marked chunks are available for new memory allocation. Sweeping may be performed by multiple GC threads in parallel. Additionally or alternatively, sweeping may be performed concurrently with application threads. An example GC cycle implementing sweeping includes the following phases:

Phase 1 (safepoint): Identify and mark objects referenced by root references;
Phase 2 (concurrent): Trace and mark objects reachable from the objects referenced by the root references;
Phase 3 (concurrent): Identify objects that have been modified as part of execution of an application during Phase 2;
Phase 4 (safepoint): Re-mark the objects identified at Phase 3;
Phase 5 (concurrent): Sweep the heap to obtain free lists and reclaim memory.

Another implementation of memory reclamation involves "compacting" a heap. During a relocation phase of a GC cycle, a GC thread copies marked objects (which are live objects) from an evacuation region (also referred to as a "from-space") to a destination region (also referred to as a "to-space"). The evacuation region and the destination region may be two different contiguous memory spaces in the heap. The evacuation region and the destination region may be the same size or different sizes. Relocating the live objects thereby "compacts" the live objects into the destination region. The evacuation region is reclaimed. The evacuation region may be available for new memory allocation. Additionally or alternatively, the evacuation region may be available as a destination region for a next GC cycle.

Various variations of compacting may be used. In an example, copying may be done with at least three different regions within a heap: an Eden space, and two survivor spaces, S1 and S2. Objects are initially allocated in the Eden space. A GC cycle is triggered when the Eden space is full. Live objects are copied from the Eden space to one of the survivor spaces, for example, S1. At the next GC cycle, live objects in the Eden space are copied to the other survivor space, which would be S2. Additionally, live objects in S1 are also copied to S2.

In an example, a GC thread selects a particular region of a heap as an evacuation region in each GC cycle based on a number, size, and/or density of live objects over different regions of the heap. For example, a region having the least memory spaces occupied by live objects may be selected as an evacuation region. Additionally or alternatively, a region having the least number of live objects may be selected as an evacuation region. The GC thread thereby concentrates its collection and compaction activity on the areas of the heap that are likely to be full of reclaimable objects, that is, garbage.

In an example, live objects from multiple evacuation regions are copied into a single destination region. Additionally or alternatively, live objects from a single evacuation region are copied into multiple destination regions. Additionally or alternatively, live objects from each evacuation region are copied into a single corresponding destination region.

Compacting may be performed by multiple GC threads in parallel. Additionally or alternatively, compacting may be performed concurrently with application threads. An example GC cycle implementing compacting includes the following phases:

Example phases within a GC cycle of a concurrent compacting collector include:
  Phase 1 (safepoint): Identify objects referenced by root references
  Phase 2 (concurrent): Trace and mark objects reachable from the objects referenced by the root references;
  Phase 3 (concurrent): Identify objects that have been modified as part of execution of an application during Phase 2;
  Phase 4 (safepoint): Re-mark the objects identified at Phase 3;
  Phase 5 (safepoint): Copy live objects from evacuation region(s) to destination region(s) and reclaim memory; remap references to relocated objects Additional and/or alternative types of GC processes, other than those described above, may be used.

In an embodiment, a heap is separated into different generational regions. A first region (which may be referred to as a "young generation space") stores objects that have not yet satisfied a criteria for being promoted from the first region to a second region; a second region (which may be referred to as an "old generation space") stores objects that have satisfied the criteria for being promoted from the first region to the second region. For example, when a live object survives at least a threshold number of GC cycles, the live object is promoted from the young generation space to the old generation space. "Generational garbage collection" refers to garbage collection using different generational regions.

In an embodiment, different GC processes may be implemented in different regions of a heap. As an example, one type of GC process may be performed for the young generation space within a heap. A different type of GC process may be performed for the old generation space within the heap.

In an embodiment, minimization of safepoint phases in a GC cycle is desired. Allowing concurrent execution in certain phases means that an application thread may encounter a particular reference that has not been fully processed with respect to the current GC phase and/or previous GC phases. Hence reference states are used to track the progress of GC operations with respect to the references. References states (also referred to as "colors") may be embedded within the references. For example, reference states may be captured by metadata stored within certain bits of a reference. Additionally or alternatively, reference states are not stored within the references, but are rather implied for the references based on surrounding context. References that do not explicitly indicate a reference state but do have a "logical reference state" necessary for concurrency may be referred to as "colorless references." As an example, a reference state of a reference in a compiled method may be the same as a method state of the compiled method. As another example, a reference state of a reference in a frame on a call stack may be the same as a frame state of the frame. Before an application thread accesses a reference (or a compiled method including references, or a frame including references), the application thread checks whether the reference has been fully processed with respect to the current GC phase based on the reference state (which is embedded in the reference or implied based on surrounding context).

In an embodiment, a reference state is stored with a heap reference but is not stored with a dereferenceable reference. The term "heap reference" refers to a reference stored on a heap 530. The term "dereferenceable reference" refers to a reference that an execution engine uses to access a value of an object being pointed to by the reference. Obtaining a value of an object being pointed to by a reference is referred to as "dereferencing" the reference. Any attempt by a thread (such as, a GC thread 506*a-b* and/or application thread 508*a-b*) to dereference a reference stored on a heap 530 first involves loading the reference from the heap 530 to a call stack of the thread. (For example, an application thread loads the reference into local variables 401, within frame 400, of a call stack, as described above with reference to FIG. 4.) References on a call stack of an application thread may be referred to as "thread stack roots," which are a type of root references. Heap references, dereferenceable references, root references, thread stack roots, and/or other references, are generally referred to herein as "references."

Figure 6:
FIG. 6 illustrates a heap reference and a dereferenceable reference according to an embodiment.
Figure 6:
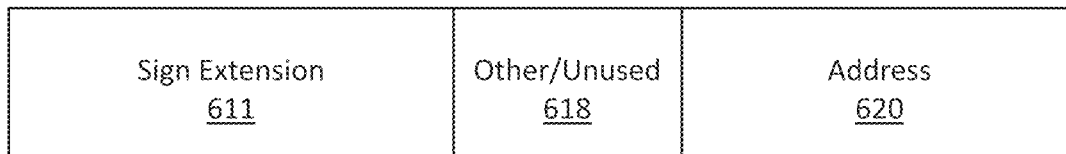
Figure 6:
Figure 6:
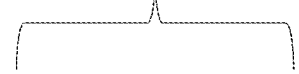
Figure 6:
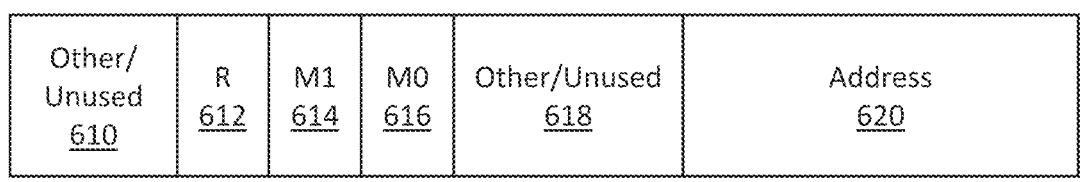
Figure 6:
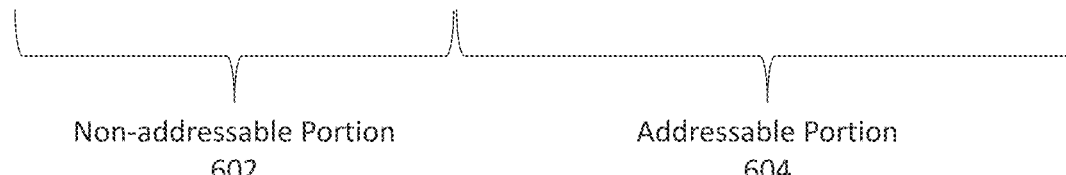

Referring to FIG. 6, FIG. 6 illustrates a heap reference and a dereferenceable reference according to an embodiment. A reference may include any number of bits, depending on the computing environment. In an Intel x86-64 machine, for example, a reference has 64 bits.

In an embodiment, a dereferenceable reference 601 includes a non-addressable portion 602 and an addressable portion 604. An addressable portion 604 defines the maximum address space that can be reached by the reference 601. Depending on the hardware system upon which an application executes, a non-addressable portion 602 may be required to comply with canonical form before the reference 601 is dereferenced. If such a requirement is imposed, the hardware system (such as a processor) generates an error when attempting to dereference a non-compliant dereferenceable reference. Hence, the non-addressable portion 602 of the reference 601 cannot be used for storing any GC-related metadata, such as GC states. In an Intel x86-64 machine, for example, an addressable portion of a reference has 48 bits, and a non-addressable portion has 16 bits. Based on the restrictions imposed by the hardware, a reference can reach at most $2^{48}$ unique addresses. Canonical form requires that the non-addressable portion be a sign extension 611 of the value stored in the addressable portion (that is, the high-order bits 48 through 63 must be copies of the value stored in bit 47).

As illustrated, addressable portion 604 includes address 620 and optionally other bits 618. The address 620 refers to the address of the object being pointed to by reference 600. The other bits 618 may be unused. Alternatively, the other bits 618 may store metadata, which may be but is not necessarily related to garbage collection.

As described above, dereferenceable references 601 include references stored on call stacks. Additionally or alternatively, dereferenceable references 601 include references embedded within compiled methods stored on a code cache and/or other memory location. A compiled method is a method that has been converted from a higher-level language (such as bytecode) to a lower-level language (such as machine code). An application thread may directly access a compiled method within the code cache, or other memory location, to execute the compiled method. As an example, a compiled method may be generated by a JIT Compiler 109 of FIG. 1. As another example, a compiled method may be generated by another component of a virtual machine.

In an embodiment, a heap reference 600 includes the same non-addressable portion 602 and addressable portion 604. However, non-addressable portion 602 need not necessarily comply with canonical form. As illustrated, non-addressable portion 602 of heap reference 600 includes transient color 606 and optionally other bits 610. Transient color 606 represents a GC state that tracks a progress of GC operations with respect to reference 600. Color 606 is "transient" because the color 606 need not stay with the reference when the reference is loaded from a heap 530 to a call stack. The other bits 610 may be unused. Alternatively, the other bits 610 may store metadata, which may be but is not necessarily related to garbage collection.

In an embodiment, transient colors 606 include M0, M1, and Remap. In an embodiment, each color is represented by a bit within heap reference 600. Bit M0 616 represents the M0 GC state. Bit M1 614 represents the M1 GC state. Bit R 612 represents the Remap GC state. Only one of M0 616, M1 614, R 612 is set at any point in time to indicate the current GC state of the heap reference 600. In another embodiment, transient colors 606 M0, M1, and Remap are expressed in different ways within heap reference 600. The colors M0, M1, and Remap are explained in further detail below with reference to FIGS. 7-8. In still another embodiment, transient colors 606 may represent a different set of GC states altogether. Transient colors 606 may represent GC states used in additional and/or alternative types of GC processes.

In an embodiment, transient color 606 (within the non-addressable portion 602) represents one set of GC states, while the other bits 618 (within the addressable portion 604) represents another set of GC states. Transient color 606 may represent one of a mutually exclusive set of GC states (such as M0, M1, and R), whereas the other bits 618 may represent one or more other GC states that are not mutually exclusive with the mutually exclusive set of GC states. The other bits 618 may track, for example, an age of a reference.

Figure 7:
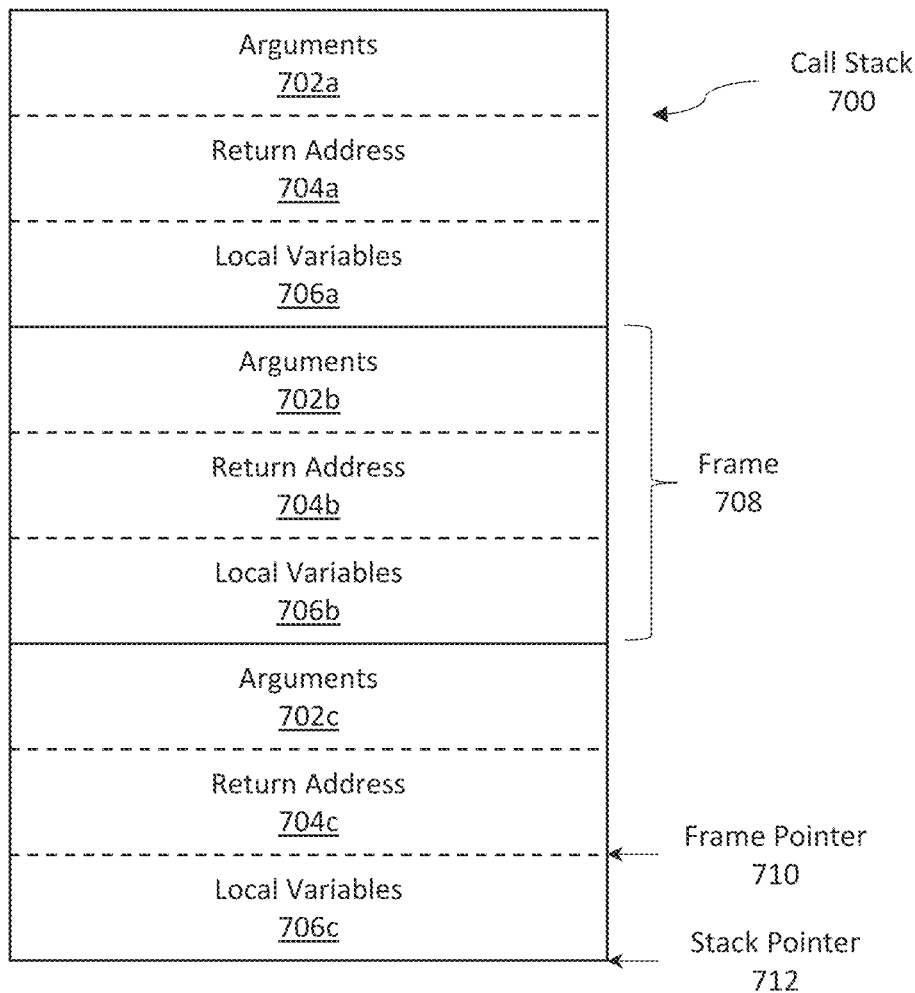
FIG. 7 illustrates components associated with a thread, including a call stack and thread-specific variables, according to an embodiment.
Figure 7:
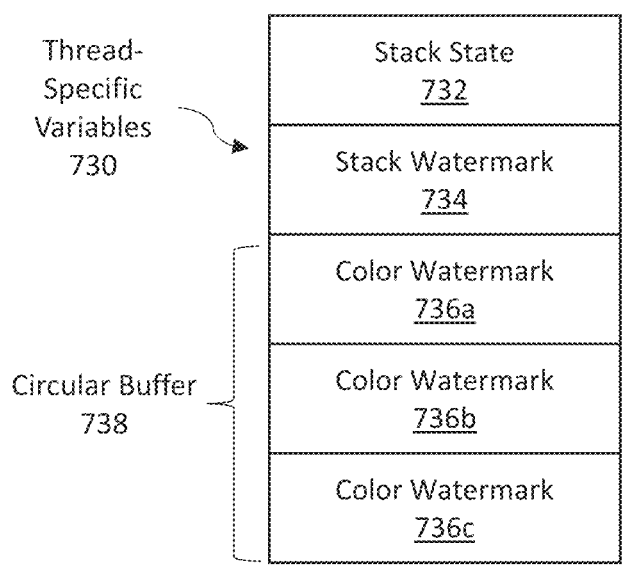

In an embodiment, surrounding context is used to imply reference states of thread stack roots. Surrounding context includes components associated with the thread. Referring to FIG. 7, FIG. 7 illustrates components associated with a thread, including a call stack and thread-specific variables, according to an embodiment. The thread-specific variables indicate frame states of frames on the call stack. A frame state of a frame is a common reference state of references within the frame.

In an embodiment, a call stack 700 (also referred to herein as a "stack") stores information associated with different functions (and/or different bodies of code) called by a thread in a program. A call stack 700 serves one or more purposes, including for example: tracking a return address (such as any of return addresses 704a-c, which an address of a call site in a calling function) for return upon completion of execution of a callee function; passing arguments (such as any of arguments 702a-c) from a calling function to a callee function; and storing local variables (such as any of local variables 706a-c) in the context of a particular function.

In an embodiment, each function corresponds to a frame 708 on a call stack 700. When a new function is called, a new frame 708 is pushed onto the stack 700. When execution of the function is complete, the frame 708 is popped from the stack 700. A function currently being executed may be referred to as an "active function." An active function corresponds to a frame 708 at the top of a call stack 700, which may be referred to as an "active frame." In an embodiment, overhead instructions, in a function prologue 1202 and/or function epilogue 1206, are executed to switch between different frames on a call stack 700, as further described below with reference to FIG. 12.

Depending on a configuration of a virtual machine, a call stack 700 may grow in the positive or negative direction. As an example, when a new frame is pushed onto a call stack, a memory address corresponding to the new frame may be lesser than a memory address corresponding to a frame already on the call stack. The call stack is said to grow in the negative direction. As another example, when a new frame is pushed onto a call stack, a memory address corresponding to the new frame may be greater than a memory address corresponding to a frame already on the call stack. The call stack is said to grow in the positive direction. Whether a call stack 700 grows negatively or positively, an end of the call stack 700 storing the most-recently pushed frame is referred to as the "shallower" end, and the opposite end storing the first pushed frame is referred to the "deeper" end.

In an embodiment, each frame 708 stores, for the corresponding function, arguments 702b (if any), a return address 704b, and local variables 706b (if any). References to objects in a heap may be included in arguments and/or local variables. References on the call stack 700 may be referred to as "thread stack roots."

In one or more embodiments, a frame pointer 710 references an address within an active frame that corresponds to the top of the call stack 700 before any local variables 706c are stored in that frame. In one or more embodiments, a stack pointer 712 references an address that corresponds to the top of the call stack 700, as the call stack 700 grows or shrinks. In one or more embodiments, a stack pointer 712 is maintained in a register. As an example, in an x86_86 machine, a stack pointer is stored in an RSP register. However, a frame pointer 710 may be but is not necessarily maintained in any register. In an embodiment, no register stores a value for the frame pointer 710 (thereby freeing up a register for other purposes); rather, a value for the frame pointer 710 (that is, an address within an active frame that corresponds to the top of the call stack before any local variables are stored in that frame) is computed based on the stack pointer 712 and/or other information associated with the program, such as a program counter. As an example, based on the program counter, the instructions that have been executed may be determined. The local variables that are stored based on the executed instructions may be determined. The size of the local variables may be determined. Therefore, the value of the frame pointer may be computed as the stack pointer minus the size of the local variables.

In one or more embodiments, multiple call stacks 700 are concurrently used in a virtual machine, each call stack 700 associated with a different thread of the virtual machine. The threads in a virtual machine may include, for example, one or more application threads, one or more GC threads, and one or more stack sampling threads. Additional and/or alternative threads may be used.

In one or more embodiments, each application thread is associated with one or more thread-specific variables 730. Different threads may each have a thread-specific variable 730 of the same name; however each thread accesses the thread's own thread-specific variable 730 using the name. In an embodiment, without special handling (such as extra synchronization primitives), a thread-specific variable 730 (also referred to as a "thread local value") for a thread of a specific type (such as an application thread) cannot be read and/or written to by other threads of the same type (such as other application threads). However, the thread-specific variable 730 may be read and/or written to by threads of other types (such as a GC thread).

In an embodiment, a thread-specific variable 730 is maintained in a memory location, which is referenced by a value stored in a register. As an example, in an x86_64 machine, an R15 register stores a value that references a memory location in which a thread local value is stored. Each thread (in a multi-threaded program) is associated with a respective register state. When switching threads, a value stored in an R15 register of the outgoing thread is saved in memory, and a value previously saved in memory for the R15 register for the incoming thread is loaded into the R15 register.

In an embodiment, thread-specific variables 730 stores, for an application thread, a stack state 732, a stack watermark 734, and one or more color watermarks 736a-c.

In an embodiment, a stack watermark 734 "marks" a deepest frame 708 on a call stack 700 whose frame state is equal to the stack state 732. The stack watermark 734 may mark the frame in various ways. As an example, a stack watermark marking a particular frame may be set to a value (a) shallower than or equal to an address referenced by a frame pointer associated with the particular frame and (b) deeper than a shallowest address of the particular frame. The address referenced by the frame pointer is also a shallowest address within the particular frame that does not belong to memory reserved for local variables of the particular frame. The shallowest address within the particular frame is also a shallowest address belonging to the memory reserved for local variables of the particular frame. Where a call stack grows in a negative direction, a stack watermark may be a value (a) less than or equal to an address referenced by a frame pointer associated with the particular frame, and (b) greater than a smallest address of the particular frame. Where a call stack grows in a positive direction, a stack watermark may be a value (a) greater than or equal to an address referenced by a frame pointer associated with the particular frame, and (b) less than a greatest address of the particular frame. As another example, the value of a stack watermark may be an identifier of a particular frame, and/or any value from which the particular frame may be inferred.

In an embodiment, a stack watermark 734 is valid only if the stack state 732 is equal to the global state tracking the progress of GC cycles of one or more GC threads.

In an embodiment, a color watermark 736a-c "marks" a deepest frame 708 on a call stack 700 whose frame state is equal to a particular state. Each color watermark is associated with both (a) a frame value, indicating a frame being marked, and (b) a state value, indicating the frame state of the marked frame (and zero or more frames shallower than the marked frame).

In an embodiment, a layout of a color watermark 736a-c is similar to a heap reference 600, as illustrated in FIG. 6. The bit locations within a heap reference 600 corresponding to transient color 606 are the same bit locations within a color watermark 736a-c indicating an associated state value. The bit locations within a heap reference 600 corresponding to an addressable portion 604 are the same bit locations within a color watermark 736a-c indicating a frame value. The frame value is (a) shallower than or equal to an address referenced by a frame pointer associated with the frame being marked and (b) deeper than a shallowest address of the frame being marked.

In an embodiment, the thread-specific variables storing color watermarks 736a-c are implemented as a thread-specific circular buffer 738. In another embodiment, the thread-specific variables storing color watermarks 736a-c are implemented as any type of thread-specific stack. In yet another embodiment, a new thread-specific variable for storing a color watermark is allocated every time a new color watermark is added, and an existing thread-specific variable storing a color watermark is deallocated every time an existing color watermark is deleted.

Hence, a frame state may be inferred for a frame 708 based on a stack state 732, a stack watermark 734, and one or more color watermarks 736a-c. A reference state may be inferred for a reference in the frame 708 based on the frame state of the frame 708. Moreover, processing a particular frame to bring the frame from a first state to a second state involves processing each reference in the particular frame to bring each reference from the first state to the second state.

Figure 8:
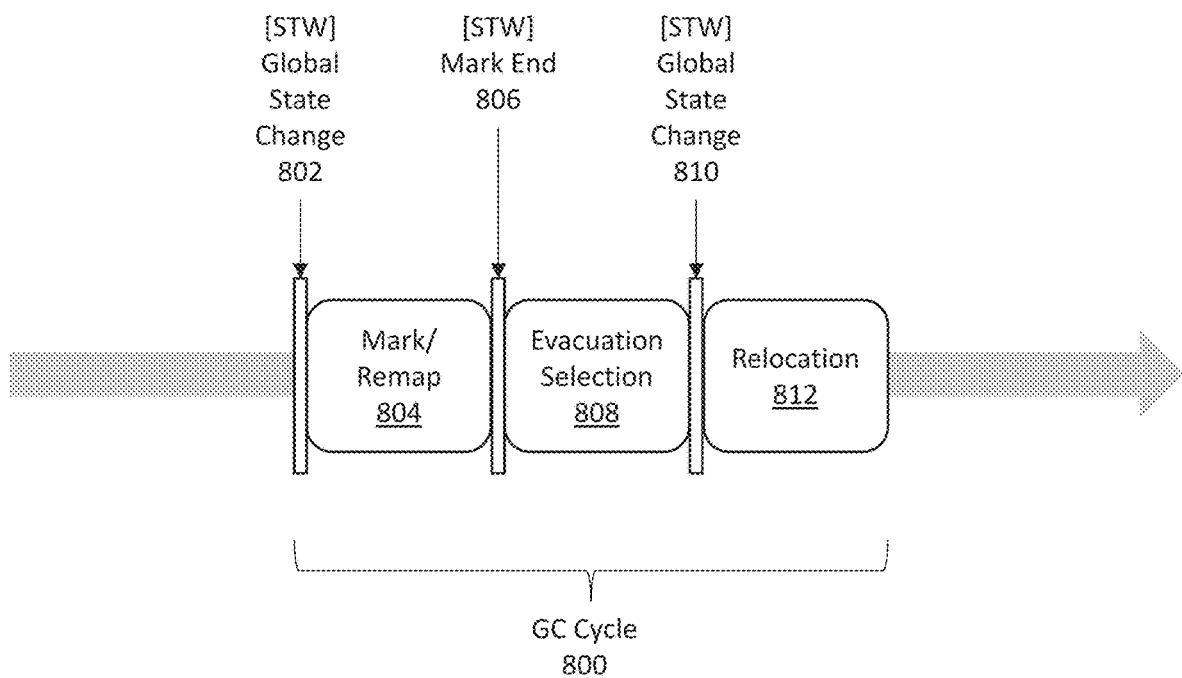
FIG. 8 illustrates a garbage collection cycle utilizing reference states to support concurrent execution according to an embodiment.

FIG. 8 illustrates a garbage collection cycle utilizing reference states to support concurrent execution according to an embodiment.

A GC cycle 800 includes the following phases: Global State Change 802, Mark/Remap 804, Mark End 806, Evacuation Selection 808, Global State Change 810, and Relocation 812. Of the above phases, the following are safepoint phases (also referred to as "non-concurrent phases" or "stop-the-world (STW) phases"): Global State Change 802, Mark End 806, and Global State Change 810. Execution of application threads 508a-b must be stopped (or otherwise paused or suspended) during the safepoint phases. The following are concurrent phases: Mark/Remap 804, Evacuation Selection 808, and Relocation 812. At a given time, the same phase and the same global state apply across GC threads 506a-b of an execution engine 502.

Detailed discussion of the phases follows. Additional and/or alternative operations, other than what is discussed below, may also be performed in each phase.

Global State Change 802 (Safepoint). A GC cycle starts with a safepoint. During Global State Change 802, one of M0 or M1 is selected as the global state. If M0 is selected as the global state during Global State Change 802 of the current GC cycle 800, then M1 is selected as the global state during Global State Change of the next GC cycle. If M0 is selected as the global state during Global State Change 802 of the current GC cycle 800, then M0 is referred to as the "current mark bit" and M1 is referred to as the "old mark bit" during the current GC cycle 800. During Global State Change 802, the GC threads 506a-b do not necessarily identify any thread stack roots.

Mark/Remap 804 (Concurrent). After Global State Change 802, the safepoint is removed. An application thread 508a-b to be resumed first undergoes thread initialization, which involves updating a stack watermark 734 and color watermarks 736a-c to reflect the frame states of the frames on the application thread's call stack 700. Execution of the application thread 508a-b then resumes. Further examples relating to thread initialization are described below with reference to FIG. 10.

The GC threads 506a-b identify root references, including thread stack roots. The GC threads 506a-b identify thread stack roots by traversing call stacks of application threads 508a-b. The GC threads 506a-b may push entries corresponding to the thread stack roots onto a marking stack. Additionally, the GC threads 506a-b mark live objects by traversing an object graph starting with the root references. The GC threads 506a-b may mark each object in the marking stack as live, and follow each object to identify additional objects. The GC threads 506a-b place the additional objects onto the marking stack as well.

During Mark/Remap 804, a GC thread may encounter a reference (also referred to as a "stale reference," which may reside on a call stack 700 or in the heap 530) that points to an old address of a corresponding object that was relocated during Relocation in a previous GC cycle. If the GC thread encounters a stale reference, the GC thread updates the reference with the current address of the corresponding object. To reflect that marking and remapping have been performed with respect to references in a frame on a call stack 700, a GC thread 506a-b shifts a stack watermark 734 to indicate that the frame state of the frame is now the global state. Alternatively to reflect that marking and remapping have been performed with respect to a heap reference, a GC thread 506a-b changes the reference state of the reference to the global state. Hence references, both on call stacks 700 and in the heap 530, are marked and remapped at the completion of Mark/Remap 804. Further examples relating to marking and remapping are described below with reference to FIGS. 11A-B.

Optionally, per-page liveness information (the total number and the total size of live objects on each memory page) is recorded. The liveness information may be used to select evacuation regions during Evacuation Selection 808.

Mark End 806 (Safepoint). The GC threads 506a-b confirm that marking and remapping is complete. The GC threads 506a-b may determine that marking and remapping are complete by verifying that the marking stacks and the object graph have been fully traversed.

Evacuation Selection 808 (Concurrent). The GC threads 506a-b select regions (such as pages or other portions of memory) of the heap 530 for evacuation. The GC threads 506a-b may select evacuation pages based on per-page liveness information recorded during Mark/Remap 804.

Global State Change 810 (Safepoint). A safepoint is established. During Global State Change 810, the global state changes to R, which effectively invalidates all references. During Global State Change 802, the GC threads 506a-b do not necessarily relocate any live objects. Further, the GC threads 506a-b do not necessarily remap any references.

Relocation 812 (Concurrent). After Global State Change 810, the safepoint is removed. An application thread 508a-b to be resumed first undergoes thread initialization, which involves updating a stack watermark 734 and color watermarks 736a-c to reflect the frame states of the frames on the application thread's call stack 700. Execution of the application thread 508a-b then resumes. Further examples relating to thread initialization are described below with reference to FIG. 10.

The GC threads 506a-b relocate live objects (corresponding to either root references or heap references identified during Mark/Remap 804) that are stored in the evacuation regions. The GC threads 506a-b relocate the objects to one or more destination regions. In an embodiment, the GC threads 506a-b select an empty region as a destination for the relocated objects. In another embodiment, additional and/or alternative methods may be used for selecting a destination for the relocated objects. References to the relocated objects thereby become stale.

One or more forwarding tables (such as per-page forwarding tables) are used to record a map from old addresses to new addresses. The forwarding tables are consulted by the application threads 508a-b when accessing stale references, and/or by the GC threads 506a-b during Mark/Remap 804 of the next GC cycle (if no application thread 508a-b has accessed the stale references). During Relocation 812, the GC threads 506a-b do not necessarily remap any references.

In an embodiment, during any of the above concurrent phases, an application thread 508a-b may attempt to load a reference from a heap 530 to a call stack 700. The application thread 508a-b hits a "load barrier," which includes a check to determine whether a reference state of the reference matches the global state. A good-colored reference results in proceeding with a fast path; the application thread 508a-b continues execution of the application, which may involve using the reference loaded from the heap 530 onto the call stack 700, and incurs no additional work. Otherwise, the application thread 508a-b takes a slow path. The slow path involves selecting and executing appropriate GC operations that will bring the reference from the reference state to the global state. Once the reference is in the global state, the slot where the reference resides in the heap 530 is updated with a good-colored alias to avoid subsequently hitting the slow path (updating to the global state may also be referred to as "self-healing"). Further examples relating to load barriers are described in the related [R00585NP], which is incorporated by reference.

In an embodiment, during any of the above concurrent phases, an application thread 508a-b may attempt to return from an active frame to a target frame on a call stack 700. The application thread 508a-b hits a "frame barrier," which includes a check to determine whether a frame state of the target frame matches the global state. Determining whether a frame state of the target frame matches the global state may include, for example, comparing a value for a frame pointer associated with the active frame with a thread-specific poll value, which is set to be the same as the stack watermark. If the frame pointer is equal to or shallower than the thread-specific poll value, then the frame state of the target frame matches the global state. Otherwise, the frame state of the target frame does not match the global state. A good-colored frame results in proceeding with a fast path; the application thread 508a-b continues execution of the application, returns to the earlier frame 708 (and accesses any references in the earlier frame 708), and incurs no additional work. Otherwise, the application thread 508a-b takes a slow path. Further examples relating to frame barriers are described below with reference to FIG. 15.

Figure 9:
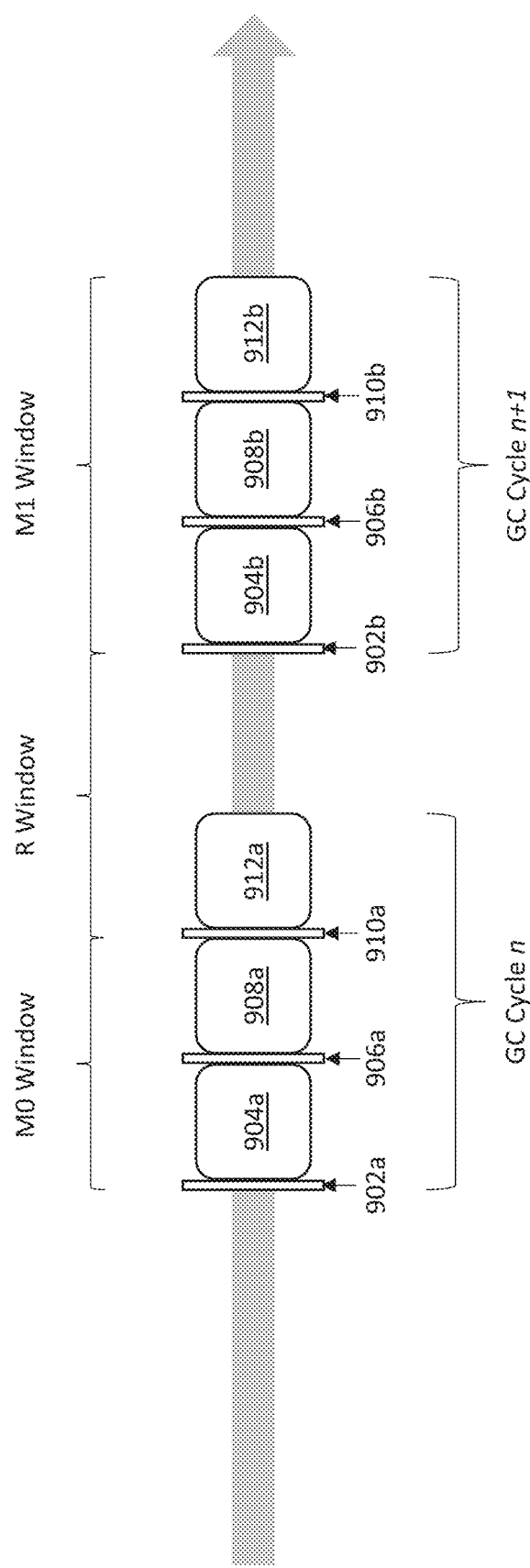
FIG. 9 illustrates multiple garbage collection cycles and corresponding global states (or "good colors") according to an embodiment.

FIG. 9 illustrates multiple garbage collection cycles and corresponding global states (or "good colors") according to an embodiment. The global state is changed twice per GC cycle, and the window for each choice of global state is shown in FIG. 9.

GC cycle n includes Global State Change 902a, Mark/Remap 904a, Mark End 906a, Evacuation Selection 908a, Global State Change 910a, and Relocation 912a. GC cycle n+1 includes Global State Change 902b, Mark/Remap 904b, Mark End 906b, Evacuation Selection 908b, Global State Change 910b, and Relocation 912b. The global state for Global State Change 902a, Mark/Remap 904a, Mark End 906a, and Evacuation Selection 908a may be M0. Hence, an "M0 Window" includes Global State Change 902a, Mark/Remap 904a, Mark End 906a, Evacuation Selection 908a. Then, the global state for Global State Change 910a, Relocation 912a, and between GC cycle n and GC cycle n+1, is R. Hence, an "R Window" includes Relocate Start 910a, Relocation 912a, and the time between GC cycle n and GC cycle n+1. For a next GC cycle, the global state for Global State Change 902b, Mark/Remap 904b, Mark End 906b, and Evacuation Selection 908b alternates to M1. Hence, an "M1 Window" includes Global State Change 902b, Mark/Remap 904b, Mark End 906b, Evacuation Selection 908b. An "R Window" (not illustrated) would then follow for Global State Change 910b, and Relocation 912b.

In an embodiment, a particular set of states is referred to as being "mutually exclusive" where only one of the particular set of states is "good" at any given time. The remaining states of the particular set of states are not good. As illustrated, for example, a particular set of states includes M0, M1, and R. One and only one of M0, M1, and R is "good" at a given time. Therefore M0, M1, and R may be referred to as a mutually exclusive set of states.

Additionally or alternatively, a particular set of states is referred to as being "mutually exclusive" where only one of the particular set of states is associated with a heap reference at any given time. The remaining states of the particular set of states are not associated with the heap reference. For example, a particular set of states includes M0, M1, and R. One and only one of M0, M1, and R is associated with a particular heap reference at a given time. Therefore M0, M1, and R may be referred to as a mutually exclusive set of states.

In an embodiment, each heap reference and each dereferenceable reference is associated with a respective one of a mutually exclusive set of states; however whereas a heap reference includes an indication of which of the mutually exclusive set of states is assumed by the heap reference, a dereferenceable reference does not include any indication of which of the mutually exclusive set of states is assumed by the dereferenceable reference. Meanwhile the dereferenceable reference may include an indication of other GC states, which are not within the mutually exclusive set. Referring back to FIG. 6, for example, bits 612, 614, 616 of heap reference 600 indicate which one of M0, M1, and R is associated with heap reference 600. Meanwhile, dereferenceable reference 601 does not include any indication of any of the states M0, M1, and R. However, heap reference 600 may additionally include an indication of GC states other than M0, M1, and R. Other bits 618 of heap reference 600 may indicate, for example, an age of a reference. Such information is maintained in other bits 618 of dereferenceable reference 601. Hence dereferenceable reference 601 may include an indication of a GC state that is not within the mutually exclusive set of states.

4. ADDING A COLOR WATERMARK TO TRACK FRAME STATES OF FRAMES ON A CALL STACK

Figure 10:
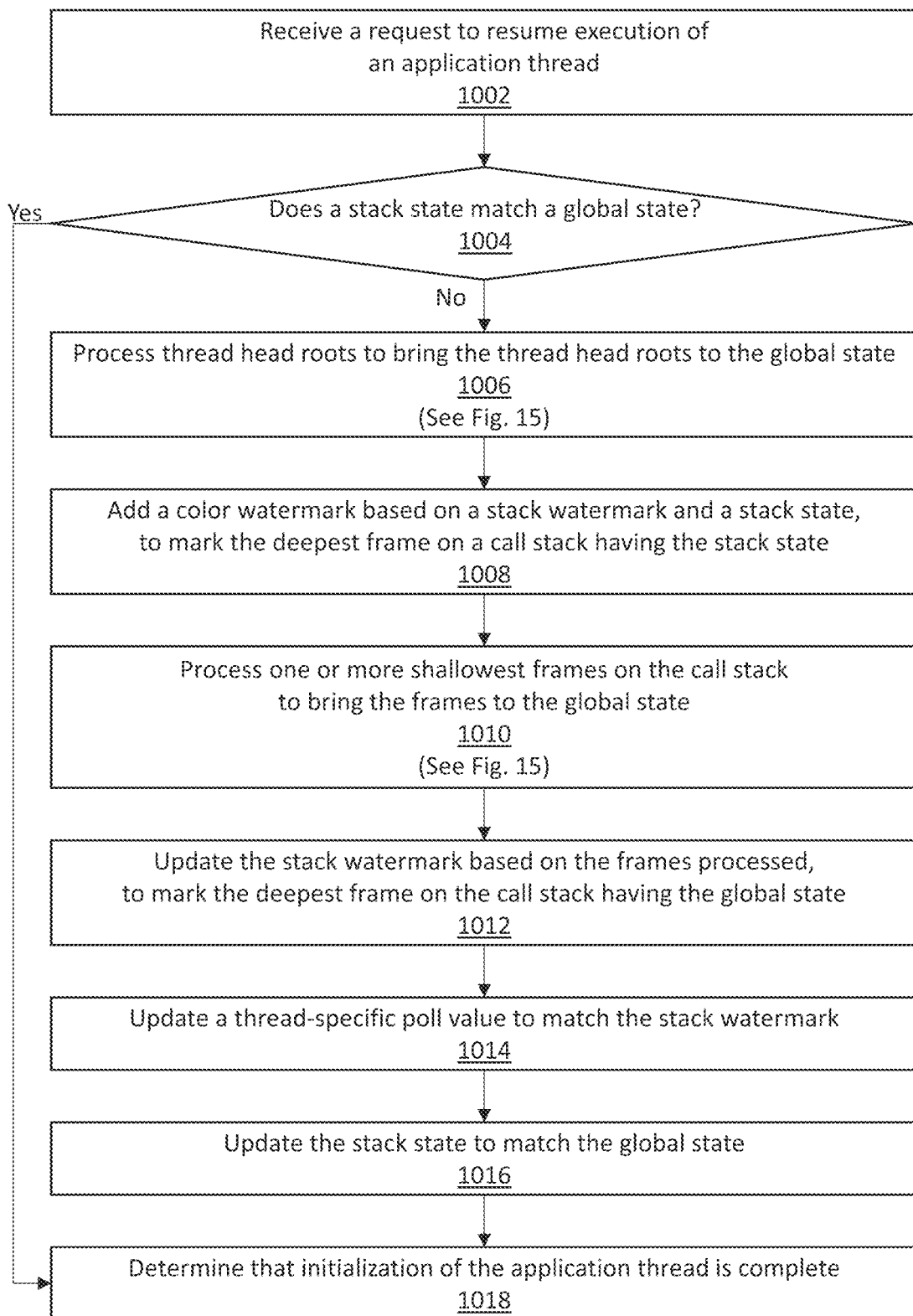
FIG. 10 illustrates a set of operations for adding a color watermark to track frame states of frames on a call stack according to an embodiment.

FIG. 10 illustrates a set of operations for adding a color watermark to track frame states of frames on a call stack according to an embodiment. One or more operations illustrated in FIG. 10 may be modified, rearranged, or omitted all together. Accordingly, the particular sequence of operations illustrated in FIG. 10 should not be construed as limiting the scope of one or more embodiments. The operations as illustrated in FIG. 10 does not limit the way the operations are expressed in a set of code. Multiple operations of FIG. 10 may correspond to a single instruction in a set of code; conversely, a single operation of FIG. 10 may correspond to multiple instructions in a set of code. The operations of FIG. 10 are described as being executed by a single application thread; however, the operations may be executed by one or more GC threads executing in parallel.

In an embodiment, the operations of FIG. 10 are performed when an application thread wakes up from a suspended, stopped, or paused state. The operations of FIG. 10 correspond to "thread initialization."

One or more embodiments include receiving a request to resume execution of an application thread (Operation 1002). An application thread is initially stopped due to a safepoint, suspension, and/or other event. The safepoint may be due to, for example, a Global State Change in a GC cycle. The current phase may be any of the concurrent phases of a GC cycle, such as Mark/Remap Phase, Evacuation Selection Phase, or Relocation Phase. The application thread receives a request to resume execution.

One or more embodiments include determining whether the application thread's stack state matches a global state associated with one or more GC threads (Operation 1004). The application thread retrieves a stack state from a thread-specific variable. The application thread also receives a global state, which may be any of the values M0, M1, or R. The application thread compares the stack state and the global state. A mismatch between the stack state and the global state indicates that there has been a global state change since the application thread was last executing, and the stack state indicates the last global state. If the stack state and the global state are the same, then thread initialization is complete (Operation 1018), as further discussed below.

If the stack state and the global state are different, one or more embodiments include processing the thread head roots to bring thread head roots to the global state (Operation 1006). Thread head roots are a type of root references that are (a) associated with a particular application thread, and (b) not stored on the particular application thread's call stack. The reference states of the thread head roots are associated with the stack state (which is the last global state). The application thread processes each thread head root to bring the thread head root from the stack state to the global state. Examples of different paths for moving from different frame states or reference states to different global states are described below with reference to FIG. 15.

One or more embodiments include adding a color watermark based on a stack watermark and a stack state, to mark the deepest frame on a call stack having the stack state (Operation 1008). The application thread retrieves a stack watermark from a thread-specific variable. The application thread retrieves a stack state from another thread-specific variable. The application thread generates a color watermark having (b) a frame value equal to the stack watermark and (b) a state value equal to the stack state. If the stack watermark is null, then the frame value instead marks the deepest frame on the call stack.

Various ways of generating the new color watermark may be used.

In an embodiment, certain bit locations in a heap reference indicate a reference state. Certain other bits in the heap reference constitute an addressable portion of the heap reference. The addressable portion of the heap reference indicates a memory location storing the corresponding object. When generating a new color watermark, the application thread stores the value of the stack state in bit locations within the new color watermark that are the same as the bit locations within a heap reference indicating a reference state. The application thread stores the value of the stack watermark in bit locations within the new color watermark that are the same as the bit locations within a heap reference corresponding to the addressable portion of the heap reference.

In an alternative embodiment, each color watermark is associated with two variables. One variable corresponds to the frame value, and another variable corresponds to the state value. The application thread stores the value of the stack state into the state value variable, and stores the value of the stack watermark into the frame value variable.

Various ways of storing the new color watermark may be used.

In an embodiment, the application thread identifies a particular set of thread-specific variables (such as thread-specific variables implemented as a thread-specific circular buffer or other thread-specific stack) configured to store one or more color watermarks. The application thread identifies a next null or empty variable of the set. The variable may be null or empty because (a) the variable has not yet stored any color watermark or (b) the variable previously stored a color watermark that is now deleted. The application thread "adds" the new color watermark by storing the color watermark in the identified thread-specific variable. The application thread overwrites any existing value for the identified thread-specific variable.

One or more embodiments include processing one or more shallowest frames on the call stack to bring the frames to the global state (Operation 1010). The application thread identifies a set of one or more shallowest frames on the call stack for processing. The number of shallowest frames to process may be defined by a GC configuration and/or other method. The application thread processes each of the identified frames to bring each frame from the stack state to the global state. Examples of different paths for moving from different frame states or reference states to different global states are described below with reference to FIG. 15.

One or more embodiments include updating the stack watermark based on the frames processed, to mark the deepest frame on the call stack having the global state (Operation 1012). The application thread identifies the deepest frame on the call stack having the global state, which is the deepest frame processed via Operation 1010. The application thread updates the stack watermark to mark the identified frame. The stack watermark may be, for example, set to a value (a) shallower or equal than an address referenced by a frame pointer associated with the identified frame and (b) deeper than a shallowest address of the identified frame.

One or more embodiments include updating a thread-specific poll value to match the stack watermark (Operation 1014). The application thread updates the thread-specific poll value to match the stack watermark. In an embodiment where the stack watermark is a value (a) shallower or equal than an address referenced by a frame pointer associated with the deepest frame having the global state and (b) deeper than a shallowest address of the deepest frame having the global state, the application thread sets the thread-specific poll value to equal the stack watermark. In other embodiments, the application thread may use other methods to determine the thread-specific poll value based on the stack watermark.

One or more embodiments include updating the stack state to match the global state (Operation 1016). The application thread sets the stack state to equal the global state. Setting the stack state to equal the global state thereby validates the stack watermark. Prior to using the stack watermark, the validity of the stack watermark is confirmed. If the stack watermark corresponding to the application thread is invalid, the thread attempting to access the stack watermark attempts to initialize the application thread to thereby validate the stack watermark. However, if the application thread is already undergoing thread initialization, the thread attempting to access the stack watermark may be blocked. Once thread initialization is complete, the thread attempting to access the stack watermark is unblocked and re-checks the validity of the stack watermark. An example of an operation that accesses the stack watermark is Operation 1106. In an embodiment, the validity of the stack watermark is confirmed prior to each use of the stack watermark. In an alternative embodiment, the validity of the stack watermark of a particular application thread is confirmed prior to each use of the stack watermark by other threads (for example, a GC thread or other application threads), but the validity of the stack watermark is assumed for the particular application thread's own use of the stack watermark and is therefore not confirmed prior to such use.

One or more embodiments include determining that initialization of the application thread is complete (Operation 1018). The application thread determines that initialization is complete. Execution of the application thread may then be resumed.

5. MARKING AND REMAPPING ROOT REFERENCES IN A FRAME ON A CALL STACK BY A GARBAGE COLLECTION THREAD

Figure 11A:
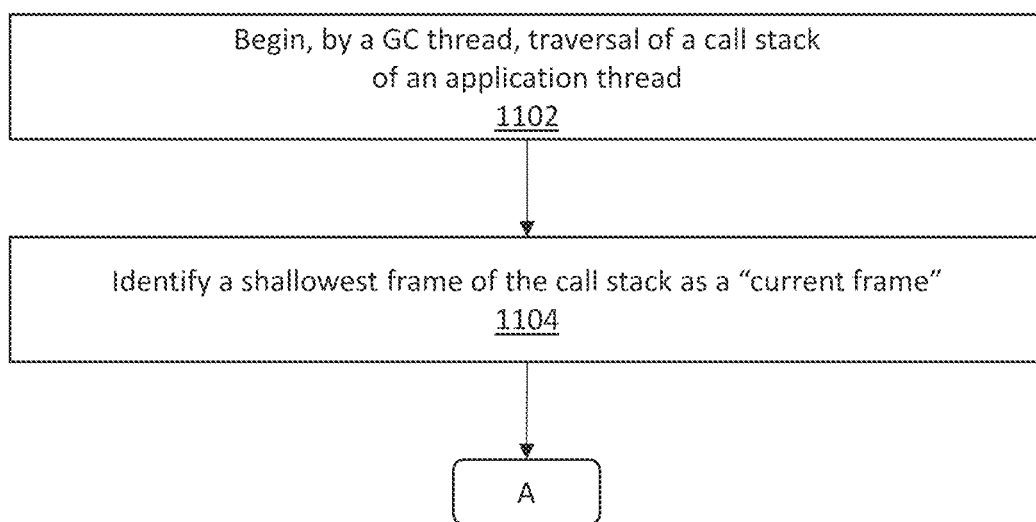
FIGS. 11A-11B illustrate a set of operations for marking and remapping root references during a concurrent garbage collection phase according to an embodiment.
Figure 11B:
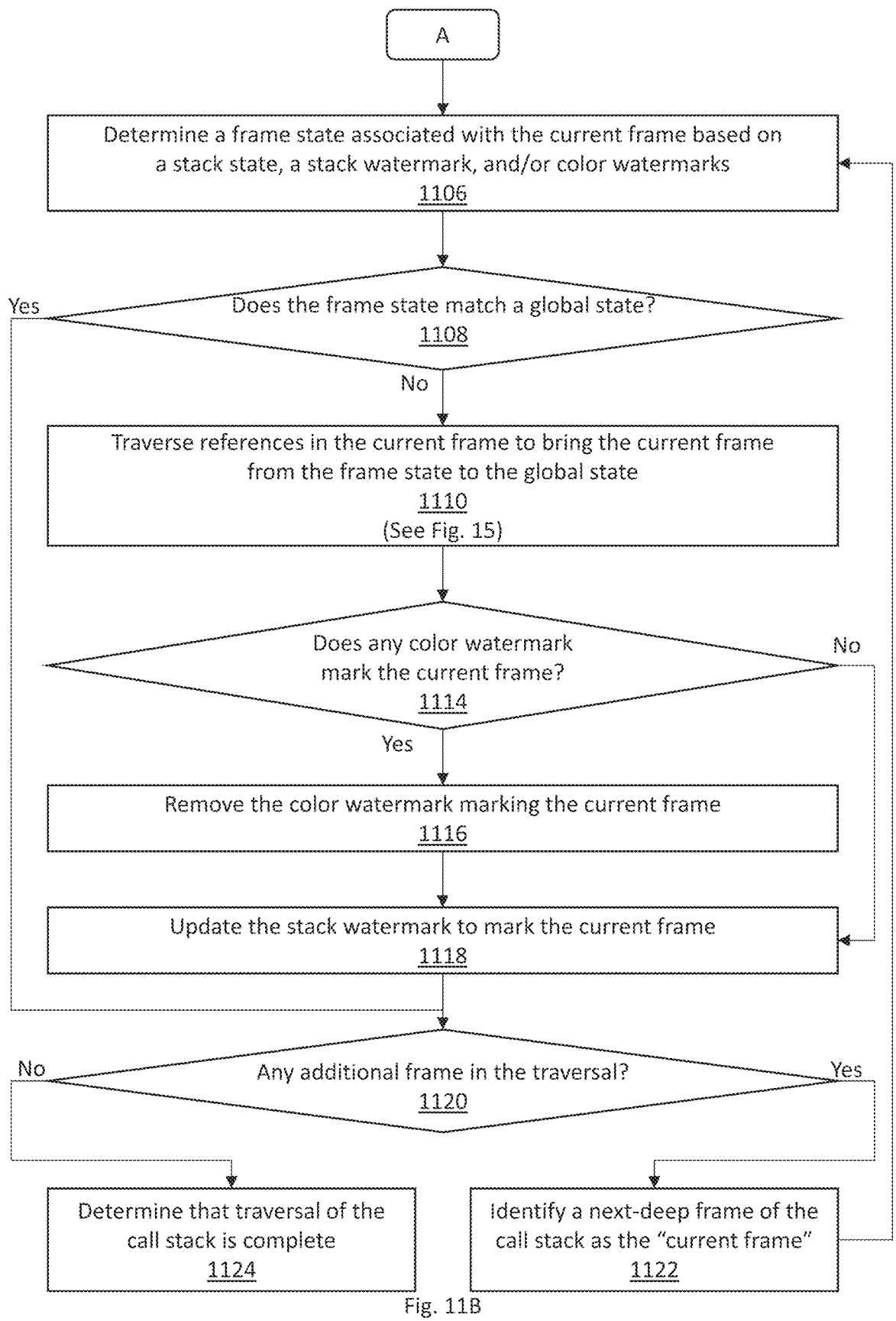

FIGS. 11A-11B illustrate a set of operations for marking and remapping root references during a concurrent garbage collection phase according to an embodiment. One or more operations illustrated in FIGS. 11A-11B may be modified, rearranged, or omitted all together. Accordingly, the particular sequence of operations illustrated in FIGS. 11A-11B should not be construed as limiting the scope of one or more embodiments. The operations as illustrated in FIGS. 11A-11B does not limit the way the operations are expressed in a set of code. Multiple operations of FIGS. 11A-11B may correspond to a single instruction in a set of code; conversely, a single operation of FIGS. 11A-11B may correspond to multiple instructions in a set of code. The operations of FIGS. 11A-11B are described as being executed by a single GC thread; however, the operations may be executed by multiple GC threads executing in parallel.

One or more embodiments include beginning traversal of a call stack of an application thread (Operation 1102). During a Mark/Remap Phase of a GC cycle, a GC thread traverses a call stack of an application thread to identify root references.

One or more embodiments include identifying a shallowest frame of the call stack as a "current frame" (Operation 1104). The GC thread begins the traversal of the call stack starting with the shallowest frame. Hence, the GC thread initially identifies the shallowest frame as a "current frame."

One or more embodiments include determining a frame state associated with the current frame based on a stack state, a stack watermark, and/or color watermarks (Operation 1106). The GC thread retrieves a stack watermark from a thread-specific variable. The GC thread determines whether the current frame is equal to or shallower than the frame marked by the stack watermark. In an embodiment where the stack watermark is a value (a) shallower or equal than an address referenced by a frame pointer associated with the deepest frame having the global state and (b) deeper than a shallowest address of the deepest frame having the global state, the GC thread retrieves and/or determines a frame pointer associated with the current thread. The GC thread determines that the current frame is equal to or shallower than the frame marked by the stack watermark if the frame pointer is equal to or shallower than the stack watermark.

If the current frame is equal to or shallower than the frame marked by the stack watermark, then the GC thread determines that the frame state of the current frame is equal to a stack state retrieved from another thread-specific variable.

Otherwise if the current frame is deeper than the frame marked by the stack watermark, then the GC thread retrieves one or more color watermarks from thread-specific variables. The GC thread identifies a state value associated with the shallowest color watermark out of the set of watermarks.

The GC thread determines that the frame state of the current frame is equal to the state value associated with the shallowest color watermark.

One or more embodiments include determining whether the frame state matches a global state (that is, the current mark state) (Operation 1108). The GC thread determines whether the frame state and a global state are the same.

In an embodiment, a bad bit mask is used. The bad bit mask has 1's only in the bit positions corresponding to bad colors, and 0's in all remaining bits. The GC thread applies a logical bit-wise AND operation to the shallowest color watermark and the bad bit mask. If the result is 0, then the frame state matches the global state, and is therefore "good." If the result is not 0, then the frame state does not match the global state. Further examples relating to bad bit masks are described in the related [R00479NP], which is incorporated by reference. Other methods for comparing the frame state and the global state may be used. If the frame state and the global state are the same, then the GC thread takes a fast path, skipping operations intended for bringing the frame to the global state. The GC thread then determines whether there are any additional frames to traverse (Operation 1120), as further described below.

If the frame state and the global state are different, one or more embodiments include traversing references in the current frame to bring the current frame from the frame state to the global state (Operation 1110). Different slow paths exist for moving from different frame states to the global state. The GC thread selects an appropriate slow path based on the frame state of the current frame. The GC thread processes the current frame to bring the current frame from the frame state to the global state. Examples of different paths for moving from different frame states or reference states to different global states are described below with reference to FIG. 15.

As an example, during a Mark/Remap Phase of a GC cycle, a call stack may include a set of frames in the remap state, and another set of frames in the old mark state. In traversing the call stack, a GC thread may reach a current frame that is not of the global state. The GC thread first determines whether the current frame is in the remap state or the old mark state. The GC thread selects one set of operations for execution if the current frame is the remap state, and a different set of operations for execution if the current frame is in the old mark state. The two sets of operations may include overlapping operations.

One or more embodiments include determining whether any color watermark marks the current frame (Operation 1114). The GC thread determines whether any color watermark marks the current frame.

In an embodiment, the GC thread determines an updated value for the stack watermark that reflects the updated frame state of the current frame. The updated value for the stack watermark is (a) shallower or equal than an address referenced by a frame pointer associated with the current frame and (b) deeper than a shallowest address of the current frame. The GC thread compares the updated value with the shallowest color watermark. If the updated value and the shallowest color watermark are the same, then the GC thread determines that the shallowest color watermark marks the current frame. Otherwise if the updated value and the shallowest color watermark are different, then the GC thread determines that no color watermark marks the current frame. Other methods for determining whether any color watermark marks the current frame may be used.

If a color watermark marks the current frame, one or more embodiments include removing the color watermark (Operation 1116). The GC thread removes the color watermark marking the current frame. In an embodiment, the GC thread overwrites the thread-specific variable storing the color watermark with a null value. In another embodiment, the GC thread updates metadata corresponding to the thread-specific circular buffer storing color watermarks. The circular buffer metadata indicates that a next addition of a color watermark should be stored in the entry corresponding to the color watermark marking the current frame. Other methods for removing the color watermark may be used.

One or more embodiments include updating the stack watermark to mark the current frame (Operation 1118). The GC thread updates the stack watermark to a value (a) shallower or equal than an address referenced by a frame pointer associated with the current frame and (b) deeper than a shallowest address of the current frame. In an embodiment, the updated value for the stack watermark may have been determined as part of Operation 1114, as described above. The stack watermark is updated even if the traversal of the entire call stack is not yet complete.

Additionally, the GC thread updates a thread-specific poll value to match the stack watermark. Examples of operations for updating the thread-specific poll value are described above with reference to Operation 1014 of FIG. 10.

One or more embodiments include determining whether there are any additional frames to traverse (Operation 1120). If the GC thread has reached the deepest frame, then there are no additional frames to traverse.

If there are additional frames in the traversal, one or more embodiments including identifying a next-deep frame on the call stack as the "current frame" (Operation 1122). The GC thread identifies a next frame that is deeper than the current frame. The GC thread then identifies the next frame as the "current frame." The GC thread iterates Operations 1106-1120 with respect to the current frame. The GC thread thereby traverses the call stack, from the shallowest frame to the deepest frame.

If there are no additional frames in the traversal, one or more embodiments include determining that traversal of the call stack is complete (Operation 1124). The GC thread determines that traversal of the call stack is complete.

The GC thread may begin tracing live objects from the thread stack roots as the thread stack roots are being identified. Alternatively the GC thread may begin tracing live objects only after traversal of the call stack is complete. Tracing involves marking a respective live bit associated with each live object. After traversal of the call stack is complete, and traversal of the object graph of live objects is complete, then the Mark/Remap Phase ends.

In an embodiment, while traversing the call stack, the GC thread may encounter frames of different frame states. As an example, in a first few iterations of Operations 1106-1120, the GC thread may identify frames on the call stack in the remap state. The GC thread takes a certain slow path for processing each frame from the remap state to the current mark state. In the remainder iterations of Operations 1106-1120 that completes traversal of the call stack, the GC thread may identify frames on the call stack in the old mark state. The GC thread takes another slow path for processing each frame from the old mark state to the current mark state.

6. PROCESSING A FRAME BARRIER TO A FRAME ON A CALL STACK BY AN APPLICATION THREAD

Figure 12:
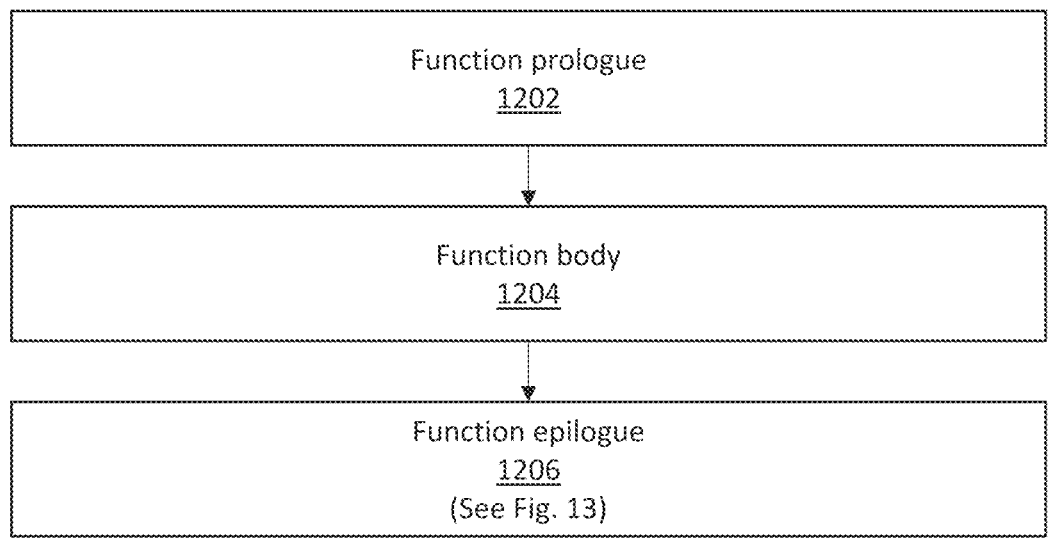
FIG. 12 illustrates an example set of stages of execution of a function according to an embodiment.
Figure 13:
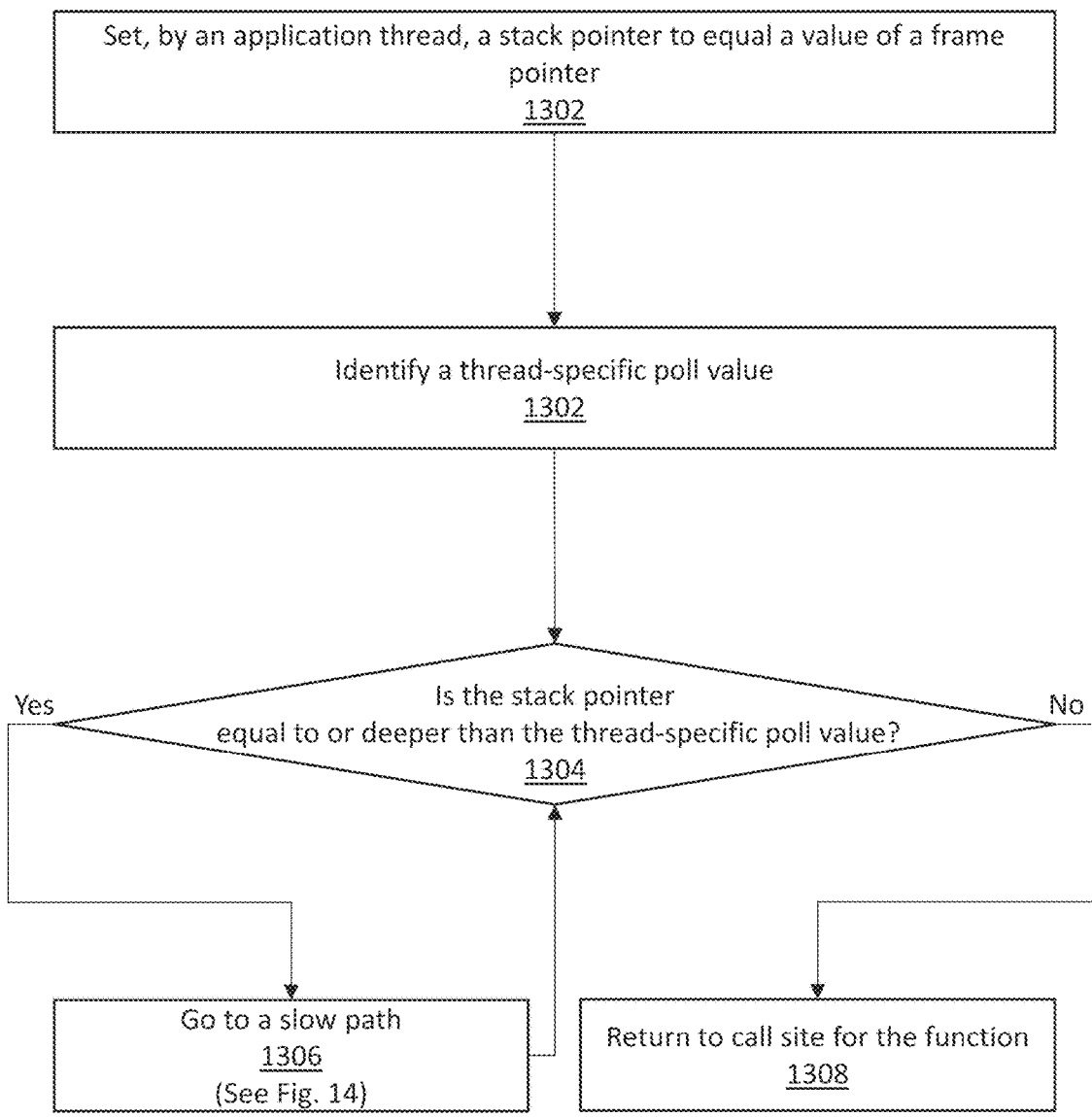
FIG. 13 illustrates an example set of operations for using a conditional branch in a function epilogue to provide frame-specific control according to an embodiment.
Figure 14:
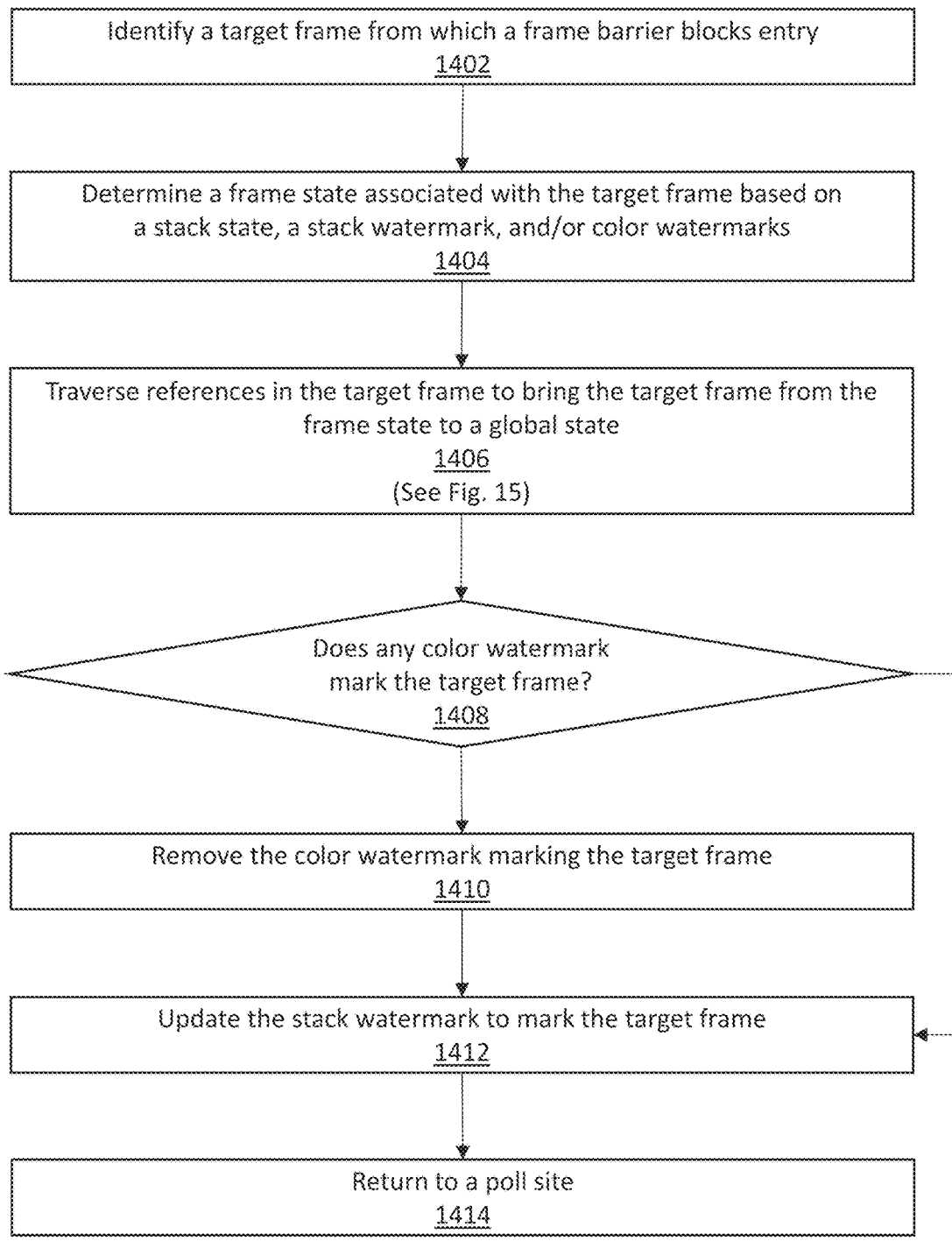
FIG. 14 illustrates an example set of operations for handling a frame barrier based on a frame state and a global state according to an embodiment.

One or more operations illustrated in FIGS. 12-14 may be modified, rearranged, or omitted all together. Accordingly, the particular sequence of operations illustrated in FIGS. 12-14 should not be construed as limiting the scope of one or more embodiments. The operations as illustrated in FIGS. 12-14 does not limit the way the operations are expressed in a set of code. Multiple operations of FIGS. 12-14 may correspond to a single instruction in a set of code; conversely, a single operation of FIGS. 12-14 may correspond to multiple instructions in a set of code. The operations of FIGS. 12-14 are described as being executed by a single application thread; however, the operations may be executed by one or more application threads and/or GC threads. Further examples relating to return conditions and conditional branches are described in the related [R00479NP], which is incorporated by reference.

FIG. 12 illustrates an example set of stages of execution of a function according to an embodiment. Execution of a function may include the following states: function prologue 1202, function body 1204, and function epilogue 1206. More or fewer stages than the above stages may be used. The function prologue 1202 and/or function epilogue 1206 constitute procedural functionality for integrating core code into a body of other code. The core code functionality is not for integrating the core code into the body of other code, but rather to accomplish a function not performed by the body of other code.

In an embodiment, a function prologue 1202 includes instructions that prepare, on a call stack, a new frame corresponding to a callee function. A function prologue 1202 includes, for example, pushing a return address on the call stack (that is, an address of a call site within a calling function). Additionally or alternatively the function prologue 1202 includes, for example, shifting a stack pointer to the top of the call stack (including information pushed onto the call stack thus far (such as the return address and, optionally, the value of the frame pointer), and memory reserved for local variables associated with the callee function).

In one or more embodiments, a function body 604 includes instructions necessary for achieving a purpose of a function. As an example, a purpose of a function may be to determine a sum of two variables. A function body of the function may include instructions that determines the respective values of the two variables, and adds the two values together.

In one or more embodiments, a function epilogue 606 includes instructions that restore, on a call stack, a frame corresponding to a calling function. A function epilogue 606 includes instructions performed after a function body 604 (a functional portion of code) but before a return call from the callee function. A function epilogue 606 includes, for example, shifting a stack pointer to equal a frame pointer associated with the callee function's frame, and returning to the calling site. Additionally, a function epilogue 606 may include polling prior to returning to the calling site. Polling involves determining whether a return condition is satisfied. If the return condition is satisfied, a conditional branch is executed. Further examples relating to polling and conditional branches are described below with reference to FIGS. 13-14.

In one or more embodiments, a first set of code is compiled and/or interpreted into a second set of code. The first set of code specifies a function body of a function. The first set of code does not specify any instructions that are directly compiled and/or interpreted into instructions of the function prologue 602 and function epilogue 606. During compilation and/or interpretation, the compiler and/or interpreter inserts instructions into the second set of code that constitute the function prologue 602 and function epilogue 606.

As an example, the following source code may be executed:
public static void main(String[ ] args) {
  System.out.println("Hello World");
}

In the above example, main calls println. Hence, main may be referred to as a "calling function," and println may be referred to as a "callee function." On a call stack, a frame corresponding to main is first pushed. When main calls println, a frame corresponding to println is pushed. Execution of a function body of println involves printing "Hello World." After execution of the function body, a function epilogue of println is executed. A function epilogue of println includes operations such as moving a stack pointer, moving a frame pointer, polling, and returning to the calling function main. Reviewing the example source code, the example source code does not include any line corresponding to operations such as moving a stack pointer, moving a frame pointer, polling, and returning to the calling function main (setting a program counter to reference an instruction associated with a call site in main). Hence, as described above, the function epilogue includes code that is not directly compiled and/or interpreted from the source code; rather the function epilogue is inserted by a compiler and/or interpreter.

FIG. 13 illustrates an example set of operations for using a conditional branch in a function epilogue to provide frame-specific control according to an embodiment. Operations of FIG. 13 are executed after execution of a function body of an active function. At the completion of the execution of the function body of the active function, the active frame of the call stack (the frame at the top of the call stack) corresponds to the active function. A stack pointer references the top of the call stack, which currently includes the local variables associated with the active function. Optionally, a frame pointer references the top of the call stack before the local variables associated with the active function were added to the call stack.

One or more embodiments include setting a stack pointer to equal a value of a frame pointer (Operation 1302). During a function epilogue of an active function, an application thread determines a value of a frame pointer associated with an active frame on a call stack. Depending on a configuration of a virtual machine, the frame pointer may or may not be maintained in a register. If the frame pointer is maintained in a register, then the value of the frame pointer is retrieved from the register. If the frame pointer is not maintained in a register, then the value of the frame pointer may be computed based on the stack pointer and/or other information associated with the program, such as a program counter.

The application thread identifies a register configured to store a stack pointer. As an example, in an x86_64 machine, a RSP register is configured to store a stack pointer. The application thread writes the value of the frame pointer into the identified register. Hence, the stack pointer is set to the value of the frame pointer. Both the stack pointer and the frame pointer reference the top of the call stack before local variables associated with the active function were added to the call stack.

One or more embodiments include identifying a thread-specific poll value (Operation 1302). The application thread loads a thread-specific poll value from a thread-specific variable. The thread-specific poll value is equal to a stack watermark, which tracks a deepest frame on a call stack that has a global state associated with one or more GC threads. Examples of operations for setting the thread-specific poll value are described above with reference to Operation 1014 of FIG. 10, Operation 1118 of FIG. 11, and Operation 1412 of FIG. 14.

One or more embodiments include determining whether the stack pointer is equal to or deeper than the thread-specific poll value (Operation 1304). Polling is performed as part of a function epilogue. During polling, a return condition is tested.

Depending on a configuration of a virtual machine, a call stack may grow in the positive or negative direction. In an embodiment, the call stack grows in the negative direction. Hence, a return condition to be tested is whether the stack pointer is greater than or equal to the thread-specific poll value. In an alternative embodiment, the call stack grows in a positive direction. Hence, a return condition to be tested is whether the stack pointer is less than or equal to the thread-specific poll value.

If the stack pointer is equal to or deeper than the thread-specific poll value, one or more embodiments include going to a slow path (Operation 1306). The application thread hits a frame barrier, preventing the application thread from directly returning to a frame corresponding to a calling function that called the active function. The frame corresponding to the calling function is the frame immediately deeper than the active frame on the call stack. The application thread takes a slow path. Examples of operations of a slow path are further described below with reference to FIG. 14.

After execution of the slow path, the program thread returns to a poll site. The application thread again performs polling to determine whether the stack pointer is now equal to or deeper than the thread-specific poll value (Operation 1304).

If the stack pointer is not equal to or deeper than the thread-specific poll value, one or more embodiments include returning to a call site for the function (Operation 1308). The application thread retrieves a return address area from the active frame corresponding to the active function. The return address is a memory location of a call site for the active function, which is a memory location of an instruction within the calling function. The application thread jumps to the return address. The application thread pops the top frame on the call stack. The active function is now the calling function, and the active frame is now the frame corresponding to the calling function. The application thread executes the calling function.

FIG. 14 illustrates an example set of operations for handling a frame barrier based on a frame state and a global state according to an embodiment.

One or more embodiments include identifying a target frame from which a frame barrier blocks entry (Operation 1402). During a function epilogue of an active function, an application thread hits a frame barrier, preventing the application thread from returning to a frame corresponding to a calling function that called the active function. The frame corresponding to the calling function is the "target frame" from which the frame barrier blocks entry.

One or more embodiments include determining a frame state associated with the target frame based on a stack state, a stack watermark, and/or color watermarks (Operation 1404). Examples of operations for determining a frame state associated with a frame is described above with reference to Operation 1106 of FIG. 11.

One or more embodiments include traversing references in the target frame to bring the target frame from the frame state to the global state (Operation 1406). Different slow paths exist for moving from different frame states to the global state. The application thread selects an appropriate slow path based on the frame state of the target frame. The application thread processes the target frame to bring the target frame from the frame state to the global state. Examples of different paths for moving from different frame states or reference states to different global states are described below with reference to FIG. 15.

As an example, during a Mark/Remap Phase of a GC cycle, a call stack may include a set of frames in the remap state, and another set of frames in the old mark state. During application execution, an application thread may attempt to return to a target frame that is not of the global state. The application thread first determines whether the target frame is in the remap state or the old mark state. The application thread selects one set of operations for execution if the target frame is the remap state, and a different set of operations for execution if the target frame is in the old mark state. The two sets of operations may include overlapping operations.

In an embodiment, the operation of traversing references in the target frame may be performed by an application thread or a GC thread. Whether an application thread or a GC thread processes the target frame depends upon which mode the application thread currently operates in. When the application thread is in managed mode, the application thread itself (rather than the GC thread) processes the target frame. When the application thread is in unmanaged mode, the GC thread processes the target frame, without necessarily waiting for the application thread to return to managed mode. In other embodiments, whether an application thread or a GC thread processes the target frame depends upon additional and/or alternative factors.

One or more embodiments include determining whether any color watermark marks the target frame (Operation 1408). Examples of operations for determining whether any color watermark marks a particular frame are described above with reference to Operation 1114 of FIG. 11.

If a color watermark marks the target frame, one or more embodiments include removing the color watermark marking the target frame (Operation 1410). Examples of operations for removing a color watermark are described above with reference to Operation 1116 of FIG. 11.

One or more embodiments include updating the stack watermark to mark the target frame (Operation 1412). Examples of operations for updating the stack watermark to indicate that a frame has been processed are described above with reference to Operation 1118 of FIG. 11. Additionally, the GC thread updates a thread-specific poll value to match the stack watermark, as described above with reference to Operation 1118 of FIG. 11 and Operation 1014 of FIG. 10.

One or more embodiments include returning to a poll site (Operation 1414). After bringing the target frame to the global state, the application thread returns to a poll site. The application thread iterates Operation 1304 of FIG. 13. The return condition is checked again, using the updated thread-specific poll value.

7. CANDIDATE SLOW PATHS FOR UPDATING TO A GLOBAL STATE

Figure 15:
FIG. 15 illustrates a set of paths for bringing a frame including root references from a current frame state to a global state according to an embodiment.

FIG. 15 illustrates a set of paths for bringing a frame including root references from a current frame state to a global state according to an embodiment.

The left-hand column of table 1500 lists possible frame states or reference states. The top row of table 1500 lists possible global states. A path for bringing a reference from a particular reference state to a particular global state includes performing the operations listed in a cell in table 1500 that corresponds to the particular reference state and the particular global state. A path for bringing a frame from a particular frame state to a particular global state includes iterating, with respect to each reference in the frame, the operations listed in a cell in table 1500 that corresponds to the particular reference state and the particular global state. The discussion below focuses on updating reference states; updating a frame state involves iterating the operations with respect to each reference in the frame.

Where the reference or frame state equals the global state, no operations are provided, since a slow path is not necessary.

One or more embodiments for bringing a reference from the remap state to a global state of the current mark state include identifying the reference as a root reference (Cell 1502). In an embodiment, the reference is identified as a root by storing the reference into a marking stack, or other root reference list. In an embodiment, tracing of live objects starting with the reference may immediately begin. Remapping is not necessary since the remap state indicates that the reference has been remapped.

One or more embodiments for bringing a reference from the old mark state to a global state of the current mark state include remapping the address for the reference, and identifying the reference as a root reference (Cell 1504). Remapping the reference includes consulting a forwarding table, determining a new memory location of the corresponding object, and updating the reference to store the new memory location. The updated reference then points to the corresponding object in the heap. Examples of operations for identifying the reference as a root reference are described above with reference to Cell 1502.

One or more embodiments for bringing a reference from the current mark state to a global state of the remap state include remapping the address for the reference (Cell 1506). Examples of operations for remapping the reference are described above with reference to Cell 1504.

As an example, during thread initialization, an application thread processes one or more shallowest frames on the call stack to bring the frames to a global state (Operation 1010 of FIG. 10). The global state is M0. A frame state of a first frame being processed is R. Based on the frame state of R and global state of M0, the application thread selects operations in Cell 1502. A frame state of a second frame being processed is M1. Based on the frame state of M1 and global state of M0, the application thread selects operations in Cell 1504. Hence, the first frame and the second frame are in the M0 state.

As another example, during thread initialization, an application thread processes one or more shallowest frames on the call stack to bring the frames to a global state (Operation 1010 of FIG. 10). The global state is R. A frame state of a first frame being processed is, for example, M0 (the current mark state). Based on the frame state of M0 and global state of R, the application thread selects operations in Cell 1506. Hence, the first frame is in the R state.

As another example, during a Mark/Remap Phase of a GC cycle, a GC thread traverses a call stack to bring each frame to a global state of, for example, M0 (the current mark state). The GC thread traverses references in a first frame on the call stack (Operation 1110 of FIG. 11). A frame state of the first frame is R. Based on the frame state of R and global state of M0, the GC thread selects operations in Cell 1502. The GC thread traverses references in a second frame on the call stack (Operation 1110 of FIG. 11). A frame state of the second frame being processed is M1. Based on the frame state of M1 and global state of M0, the application thread selects operations in Cell 1504. Hence, the first frame and the second frame are in the M0 state.

As another example, during a Mark/Remap Phase of a GC cycle, an application thread hits a frame barrier, preventing return to a target frame. A global state is, for example, M1 (the current mark state). A frame state of the target frame is R. The application thread processes the target frame (Operation 1406 of FIG. 14). Based on the frame state of R and global state of M1, the application thread selects operations in Cell 1502. Hence, the target frame is in the M1 state.

As another example, during a Remap Phase of a GC cycle, an application thread hits a frame barrier, preventing return to target frame. A global state is R. A frame state of the target frame is, for example, M1 (the current mark state). The application thread processes the target frame (Operation 1406 of FIG. 14). Based on the frame state of M1 and the global state of R, the application thread selects operations in Cell 1506. Hence, the target frame is in the R state.

8. EXAMPLE EMBODIMENT

FIGS. 16A-16H illustrate an example using a stack watermark and color watermarks to perform concurrent root reference processing according to an embodiment. A detailed example is described below for purposes of clarity. Components and/or operations described below should be understood as a specific example which may not be applicable to certain embodiments. Accordingly, components and/or operations described below should not be construed as limiting the scope of any of the claims.

In an example, an application thread and a global thread execute in an execution engine. The application thread is associated with a call stack 1600. The application thread is further associated with thread-specific variables 1612 configured to store a stack state, a stack watermark, and color watermarks. In particular, a subset of the thread-specific variables 1612 configured to store color watermarks are implemented as a circular buffer. The GC thread is associated with a global state 1610.

FIG. 16A illustrates thread components at a given point in time. The global state is M0. The stack state is M0, same as the global state. The application thread is executing a function associated with the F1 frame on the call stack.

At some point in time, the GC thread enters a Global State Change Phase of a GC cycle. In the Global State Phase, execution of the application thread is stopped. The global state changes from M0 to R.

FIG. 16B illustrates thread components during thread initialization. The GC thread enters a Relocation Phase. The application thread wakes up. The application thread checks whether the stack state is same as the global state. Since the stack state is M0 and different from the global state, the stack watermark is invalid. The application thread enters thread initialization. The application thread processes thread head roots to bring the thread head roots from M0 to R.

The application thread adds a color watermark. Since the stack watermark is currently null, the application thread identifies a deepest frame, the F0 frame, as the frame marked by the new color watermark. Additionally, the application thread identifies the stack state of M0 as the state value for the new color watermark. The application thread stores the new color watermark in an empty entry of the circular buffer. As illustrated, a thread-specific variable 1612 includes "F0, M0."

The application thread processes a shallowest frame, the F1 frame, from the stack state of M0 to the global state of R. The application thread updates the stack watermark to mark the deepest frame having the R state, which is now the F1 frame. As illustrated, the stack watermark 1602 marks the F1 frame.

The application thread updates a thread-specific poll value to match the stack watermark. The application thread updates the stack state to match the global state of R, thereby validating the stack watermark. The thread initialization is complete.

Figure 16C:
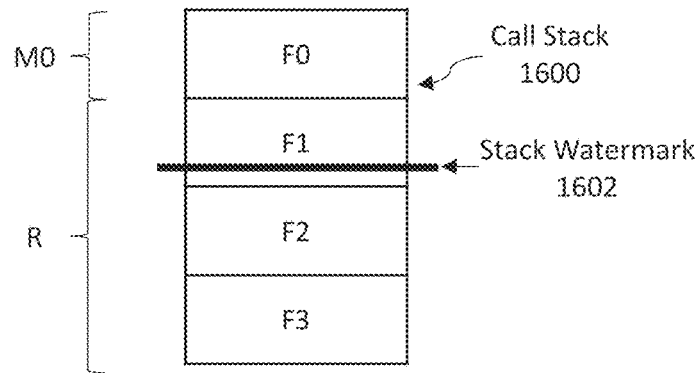

FIG. 16C illustrates thread components during execution of the application thread. Exiting from the thread initialization, the F1 frame is in the R state, and the F0 frame is in the M0 state. The frame states are consistently reflected by the stack state, stack watermark, and color watermarks. Frames (which includes F1 at this time) equal to or shallower than the frame marked by the stack watermark have the stack state (which is R at this time). Frames (which includes F0 at this time) that are (a) deeper than the frame marked by the stack watermark, and (b) equal to or shallower than the shallowest color watermark, have the state (which is M0 at this time) associated with the shallowest watermark (which marks F0 at this time).

Since the stack state and the global state have the same value of R, the stack watermark is valid. The application thread begins execution of user code. As the application thread executes user code, the application thread pushes the F2 frame and the F3 frame onto the call stack. The newly pushed frames have the global state of R.

The property that new frames on the call stack are consistent with the global state is ensured implicitly with load barriers and the stack watermark.

Object reference arguments passed into a new frame can originate from: (1) a load, (2) a new allocation, and (3) an old value that was in a register or another frame, when the traversal of the call stack started during the current phase of the current GC cycle.

First, an object reference argument originating from a load would have gone through a load barrier. The load barrier ensures the reference is consistent with the current global state. Further details relating to load barriers are described in the related [R00479NP], which is incorporated by reference.

Second, an object reference argument originating from a new allocation is inherently associated with the current global state.

Third, an object reference argument originating from an old value that was in a register or in another frame is consistent with the current global state because the application thread's access to the old value would have been conditioned upon the old value being in the global state, according to the stack watermark.

Accordingly, any reference passed as an argument into the new frame is consistent with the current global state.

New object references to an existing frame are added by: (1) loading a reference, or (2) allocating a new object. First, a reference that is loaded would have gone through a load barrier, as explained above. Second, an object that is newly allocated inherently has the current global state, as explained above. Therefore, any reference added to an existing frame is consistent with the current global state.

Hence, the frame states of the new F2, F3 frames are R. The frame states are consistently reflected by the stack state, stack watermark, and color watermarks. Frames (which includes F3, F2, F1 at this time) equal to or shallower than the frame marked by the stack watermark have the stack state (which is R at this time).

Concurrent with the execution of the application thread, the GC thread relocates live objects corresponding to thread stack roots and other root references as well as live objects corresponding to heap references. At some point in time, the GC thread enters a Global State Change Phase of a GC cycle. In the Global State Phase, execution of the application thread is stopped. The global state changes from R to M1.

Figure 16D:
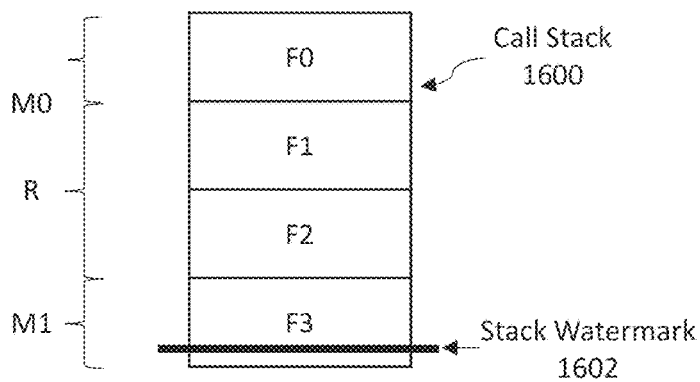

FIG. 16D illustrates thread components during thread initialization. The GC thread enters a Mark/Remap Phase. The application thread wakes up. The application thread checks whether the stack state is same as the global state. Since the stack state is R and different from the global state, the stack watermark is invalid. The application thread enters thread initialization. The application thread processes thread head roots to bring the thread head roots from R to M1.

The application thread adds a color watermark. The application thread identifies the frame marked by the stack watermark, which is the F1 frame, as the frame marked by the new color watermark. Additionally, the application thread identifies the stack state of R as the state value for the new color watermark. The application thread stores the new color watermark in an empty entry of the circular buffer. As illustrated, a thread-specific variable 1612 includes "F1, R."

The application thread processes a shallowest frame, the F3 frame, from the stack state of R to the global state of M1. The application thread updates the stack watermark to mark the deepest frame having the M1 state, which is now the F3 frame. As illustrated, the stack watermark 1602 marks the F3 frame.

The application thread updates a thread-specific poll value to match the stack watermark. The application thread updates the stack state to match the global state of M1, thereby validating the stack watermark. The thread initialization is complete.

Figure 16E:
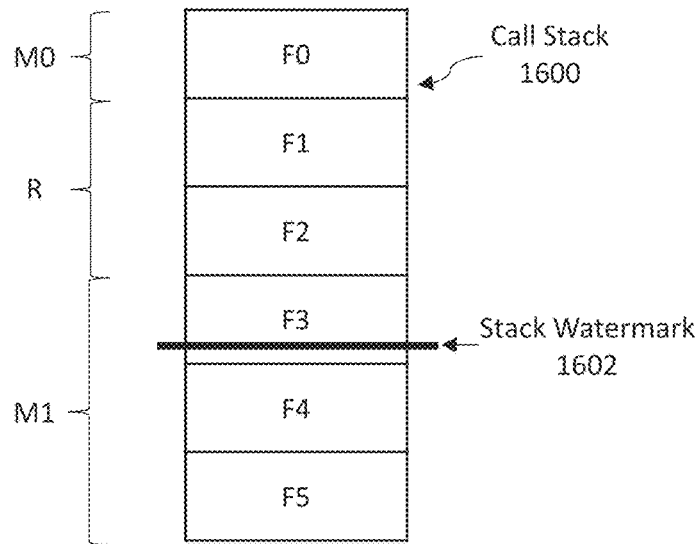

FIG. 16E illustrates thread components during execution of the application thread. Exiting from the thread initialization, the F3 frame is in the M1 state, the F1, F2 frames are in the R state, and the F0 frame is in the M0 state. The frame states are consistently reflected by the stack state, stack watermark, and color watermarks. Frames (which includes F3 at this time) equal to or shallower than the frame marked by the stack watermark have the stack state (which is M1 at this time). Frames (which includes F2, F1 at this time) that are (a) deeper than the frame marked by the stack watermark and (b) equal to or shallower than the frame marked by the shallowest color watermark, have the state (which is R at this time) associated with the shallowest color watermark (which marks F1 at this time). Frames (which includes F0 at this time) that are (a) deeper than the frame marked by the shallowest color watermark and (b) equal to or shallower than the frame marked by the next color watermark, have the state (which is M0 at this time) associated with the next color watermark (which marks F0 at this time).

Since the stack state and the global state have the same value of M1, the stack watermark is valid. The application thread begins execution of user code. As the application thread executes user code, the application thread pushes the F4 frame and the F5 frame onto the call stack. The newly pushed frames have the global state of M1.

Hence, the frame states of the new F4, F5 frames are M1. The frame states are consistently reflected by the stack state, stack watermark, and color watermarks. Frames (which includes F5, F4, F3 at this time) equal to or shallower than the frame marked by the stack watermark have the stack state (which is M1 at this time).

Figure 16F:
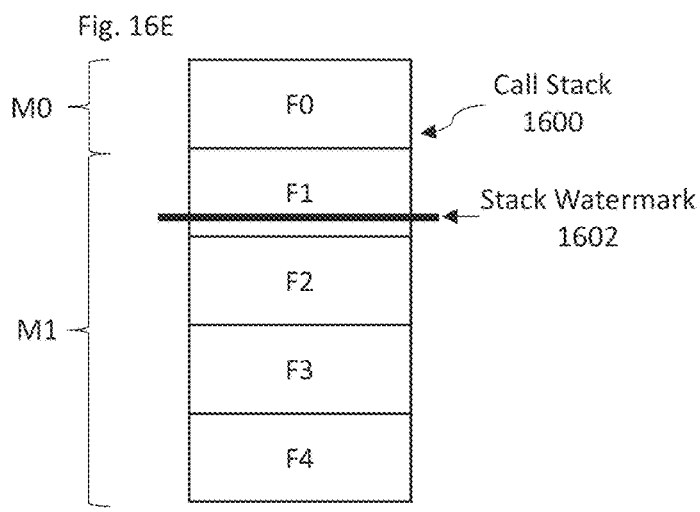

FIG. 16F illustrates thread components as frames are processed by the GC thread. The GC thread traverses the call stack. Concurrently, the application thread continues to execute, returning from the F5 frame to the F4 frame. The F5 frame is popped from the call stack.

Traversing the call stack, the GC thread processes the F4, F3 frames. The GC thread determines that the F4, F3 frames are in the global state, and therefore performs no additional operations with respect to the references therein.

The GC thread processes the F2 frame. The GC thread determines that the F2 frame is in the R state. The GC thread selects an appropriate set of operations to bring the F2 frame from the R state to the global state of M1. The GC shifts the stack watermark to mark the F2 frame, thereby indicating that the F2 frame has the global state. The GC thread determines whether the updated value for the stack watermark marks the same frame as a color watermark. Since there are no color watermarks marking the same frame, no color watermarks are deleted.

The GC thread processes the F1 frame. The GC thread determines that the F1 frame is in the R state. The GC thread selects an appropriate set of operations to bring the F1 frame from the R state to the global state of M1. The GC shifts the stack watermark to mark the F1 frame, thereby indicating that the F1 frame has the global state. The GC thread determines whether the updated value for the stack watermark marks the same frame as a color watermark. Since the "F1, R" color watermark marks the same frame, the GC thread deletes the "F1, R" color watermark. As illustrated, the entry in the circular buffer previously including "F1, R" is now "null." Further, the stack watermark 1602 marks the F1 frame.

Hence, the frame states of the F4, F3, F2, and F1 frames are M1. The frame state of F0 is M0. The frame states are consistently reflected by the stack state, stack watermark, and color watermarks. Frames (which includes F4, F3, F2, and F1 at this time) equal to or shallower than the frame marked by the stack watermark have the stack state (which is M1 at this time). Frames (which includes F0 at this time) that are (a) deeper than the frame marked by the stack watermark and (b) equal to or shallower than the shallowest color watermark, have the state (which is M0 at this time) associated with the shallowest color watermark (which marks F0 at this time).

Figure 16G:
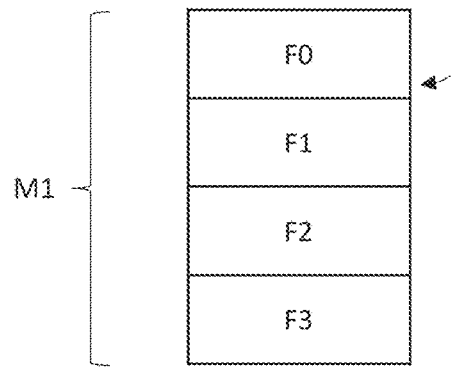

FIG. 16G illustrates thread components as frames are processed by the GC thread. The GC thread continues traversing the call stack. Concurrently, the application thread continues to execute, now returning from the F4 frame to the F3 frame. The F4 frame is popped from the call stack.

Traversing the call stack, the GC thread now processes the F0 frame. The GC thread determines that the F0 frame is in the M0 state. The GC thread selects an appropriate set of operations to bring the F0 frame from the M0 state to the global state of M1. The GC shifts the stack watermark to mark the F0 frame, thereby indicating that the F0 frame has the global state. The GC thread determines whether the updated value for the stack watermark marks the same frame as a color watermark. Since the "F0, M0" color watermark marks the same frame, the GC thread deletes the "F0, M0" color watermark. As illustrated, the entry in the circular buffer previously including "F0, M0" is now "null."

Hence, the frame states of the F3, F2, F1, and F0 frames are M1. The frame states are consistently reflected by the stack state, stack watermark, and color watermarks. Where the stack watermark is null, all frames (which includes F3, F2, F1, and F0 at this time) on the call stack are in the global state (which is M1 at this time).

The call stack in FIG. 16G is similar to the call stack in FIG. 16A in that the stack watermark is null, and all frames are associated with the same frame state.

At some point in time, the GC thread enters a Global State Change Phase of a GC cycle. In the Global State Phase, execution of the application thread is stopped. The global state changes from M1 to R.

Figure 16H:
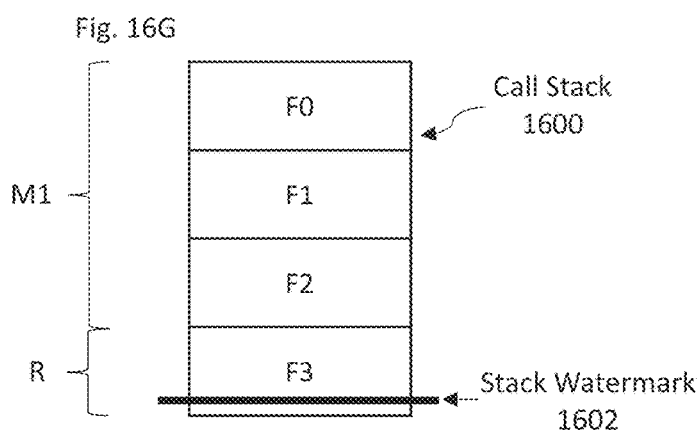

FIG. 16H illustrates thread components during execution of the application thread. The GC thread enters a Relocation Phase. The application thread wakes up. The application thread checks whether the stack state is same as the global state. Since the stack state is M1 and different from the global state, the stack watermark is invalid. The application thread enters thread initialization. The application thread processes thread head roots to bring the thread head roots from M1 to R.

The application thread adds a color watermark. Since the stack watermark is currently null, the application thread identifies a deepest frame, the F0 frame, as the frame marked by the new color watermark. Additionally, the application thread identifies the stack state of M1 as the state value for the new color watermark. The application thread stores the new color watermark in an empty entry of the circular buffer. As illustrated, a thread-specific variable 1612 includes "F0, M1."

The application thread processes a shallowest frame, the F3 frame, from the stack state of M1 to the global state of R. The application thread updates the stack watermark to mark the deepest frame having the R state, which is now the F3 frame. As illustrated, the stack watermark 1602 marks the F3 frame.

The application thread updates a thread-specific poll value to match the stack watermark. The application thread updates the stack state to match the global state of R, thereby validating the stack watermark. The thread initialization is complete.

As illustrated by FIGS. 16A-16H, the thread-specific variables 1612 are continually updated to reflect the respective frame states of the frames on the call stack 1600.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
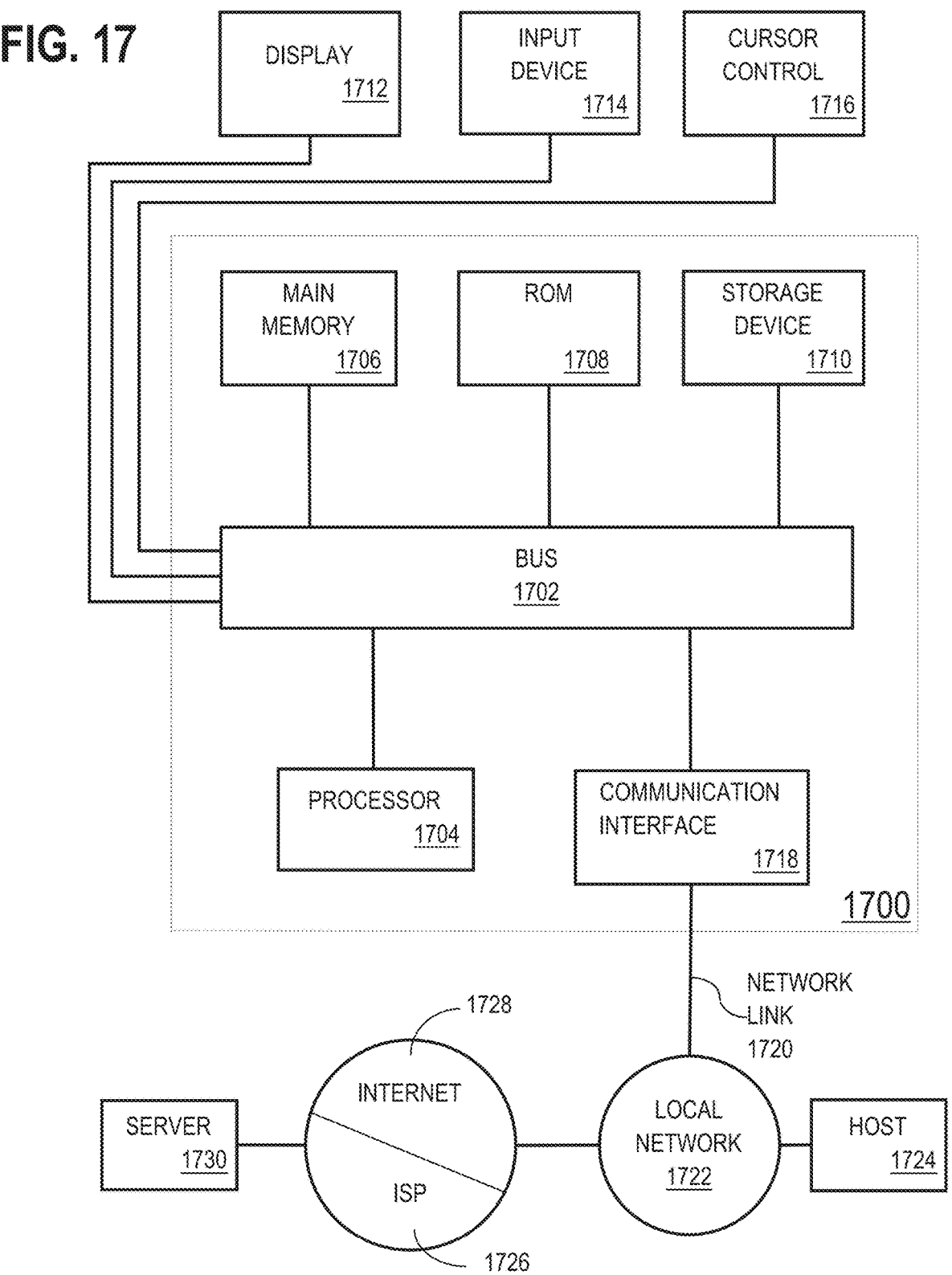
FIG. 17 illustrates a system in accordance with one or more embodiments.

For example, FIG. 17 is a block diagram that illustrates a computer system 1700 upon which an embodiment of the invention may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1710. Volatile media includes dynamic memory, such as main memory 1706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, cause:
    performing, by a garbage collection thread, a traversal of a plurality of frames on a call stack associated with an application thread such that a respective frame state of each of the plurality of frames becomes a current mark state;
        wherein assumable values for the respective frame state comprises the current mark state, a remap state, and an old mark state;
    wherein the traversal of the plurality of frames comprises:
        identifying, by the garbage collection thread, a first frame state of a first frame on the call stack;
        responsive to determining that the first frame state is the remap state: performing a first set of operations to bring the first frame state from the remap state to the current mark state;
        identifying, by the garbage collection thread, a second frame state of a second frame on the call stack;
        responsive to determining that the second frame state is the old mark state: performing a second set of operations to bring the second frame state from the old mark state to the current mark state, wherein the first set of operations and the second set of operations are different.

2. The media of claim 1, wherein:
    the first set of operations does not comprise remapping a first reference within the first frame; and
    the second set of operations comprises remapping a second reference within the second frame.

3. The media of claim 1, wherein:
    the first set of operations comprises determining that a first reference within the first frame is a first root reference; and
    the second set of operations comprises determining that a second reference within the second frame is a second root reference.

4. The media of claim 3, further storing instructions comprising:
    tracing a set of live objects from the first root reference and the second root reference.

5. The media of claim 1, further storing instructions causing:
    subsequent to performing the first set of operations and prior to performing the second set of operations: executing, by the application thread, a function associated with a third frame on the call stack.

6. The media of claim 1, wherein execution, by the garbage collection thread, of the first set of operations is concurrent with execution, by the application thread, of a function associated with a third frame on the call stack.

7. The media of claim 1, wherein the garbage collection thread performs marking and remapping within the same traversal of the plurality of frames on the call stack.

8. The media of claim 1, further storing instructions comprising:
    identifying, by the garbage collection thread, a third frame state of a third frame on the call stack;
    responsive to determining that the third frame state is the current mark state: determining that no operations need to be performed to bring the third frame state to the current mark state.

9. The media of claim 1, wherein the first set of operations and the second set of operations are performed in a same phase of a same garbage collection cycle.

10. A method, comprising:
    performing, by a garbage collection thread, a traversal of a plurality of frames on a call stack associated with an application thread such that a respective frame state of each of the plurality of frames becomes a current mark state;
        wherein assumable values for the respective frame state comprises the current mark state, a remap state, and an old mark state;
    wherein the traversal of the plurality of frames comprises:
        identifying, by the garbage collection thread, a first frame state of a first frame on the call stack;
        responsive to determining that the first frame state is the remap state: performing a first set of operations to bring the first frame state from the remap state to the current mark state;
        identifying, by the garbage collection thread, a second frame state of a second frame on the call stack;
        responsive to determining that the second frame state is the old mark state: performing a second set of operations to bring the second frame state from the old mark state to the current mark state, wherein the first set of operations and the second set of operations are different;
    wherein the method is performed by one or more devices, each including one or more hardware processors.

11. The method of claim 10, wherein:
    the first set of operations does not comprise remapping a first reference within the first frame; and
    the second set of operations comprises remapping a second reference within the second frame.

12. The method of claim 10, wherein execution, by the garbage collection thread, of the first set of operations is concurrent with execution, by the application thread, of a function associated with a third frame on the call stack.

13. The method of claim 10, wherein the garbage collection thread performs marking and remapping within the same traversal of the plurality of frames on the call stack.

14. One or more non-transitory machine-readable media storing instructions which, when executed by one or more processors, cause:

during a safepoint phase of a garbage collection cycle, updating a global state associated with a garbage collection thread to a remap state;
    wherein execution of an application thread is stopped during the safepoint phase;
during a concurrent phase of the garbage collection cycle, and while the global state is in the remap state, relocating a first object corresponding to a first root reference in a frame on a call stack associated with the application thread from a first memory location within a heap memory to a second memory location within the heap memory;
    wherein the execution of the application thread is resumed during the concurrent phase.

15. The media of claim 14, wherein the first root reference is not remapped during any safepoint phase of any garbage collection cycle.

16. The media of claim 14, wherein the first root reference is remapped during the concurrent phase of the garbage collection cycle.

17. The media of claim 14, wherein the first root reference is remapped during another concurrent phase of a next garbage collection cycle, and while the global state is in a current mark state.

18. The media of claim 14, storing instructions which cause:

remapping the first root reference from a first memory address of the first memory location to a second memory address of the second memory location responsive to the application thread attempting to access the first object during the concurrent phase of the garbage collection cycle.

19. The media of claim 14, storing instructions which further cause:

during another concurrent phase of a next garbage collection cycle, and while the application thread is executing, remapping the first root reference from a first memory address of the first memory location to a second memory address of the second memory location.

20. The media of claim 14, wherein the first root reference is lazily remapped triggered by an attempted access to the frame including the first root reference by either the application thread or a garbage collection thread.

\* \* \* \* \*